(12) United States Patent
Redekop et al.

(10) Patent No.: US 7,927,198 B2
(45) Date of Patent: Apr. 19, 2011

(54) HARVESTER CORN COBS SEPARATING

(75) Inventors: Leo Redekop, Saskatoon (CA); Dean Mayerle, Saskatoon (CA)

(73) Assignee: Redekop Enterprises Inc., Winnipeg, Manitoba (CA)

(*) Notice: Subject to any disclaimer, the term of this patent is extended or adjusted under 35 U.S.C. 154(b) by 0 days.

(21) Appl. No.: 12/266,682

(22) Filed: Nov. 7, 2008

(65) Prior Publication Data
US 2009/0124309 A1 May 14, 2009

Related U.S. Application Data

(60) Provisional application No. 61/087,409, filed on Aug. 8, 2008, provisional application No. 60/986,438, filed on Nov. 8, 2007.

(51) Int. Cl.
*A01F 12/48* (2006.01)
*B07B 1/55* (2006.01)
*B08B 5/00* (2006.01)

(52) U.S. Cl. .......................... 460/99; 460/114

(58) Field of Classification Search .......... 460/96, 460/143, 115, 131, 145, 903, 102, 100, 79, 460/23, 114, 42, 44; 56/202, 16.6, 13.3; 15/340.4, 340.3
See application file for complete search history.

(56) References Cited

U.S. PATENT DOCUMENTS

| | | | | |
|---|---|---|---|---|
| 2,037,491 A * | 4/1936 | Wagoner | ...................... | 56/401 |
| 2,619,967 A * | 12/1952 | Bond | ........................... | 460/34 |
| 2,822,811 A | 2/1958 | Slavens | | |
| 3,088,261 A * | 5/1963 | Lagouarde | .................. | 56/13.9 |
| 3,298,162 A * | 1/1967 | Medd | ............................. | 56/13.9 |
| 3,317,064 A * | 5/1967 | Fingerut | ........................ | 406/41 |
| 3,640,055 A | 2/1972 | Looker | | |
| 3,680,291 A * | 8/1972 | Soteropulos | .................. | 56/14.3 |
| 3,705,483 A * | 12/1972 | Jarrell et al. | .................. | 56/13.5 |
| 3,721,075 A * | 3/1973 | Weiberg | ........................ | 56/13.5 |
| 4,121,778 A * | 10/1978 | Quick | ............................. | 241/79 |
| 4,188,160 A | 2/1980 | Corbet | | |
| 4,287,707 A * | 9/1981 | Persoons et al. | .............. | 56/12.8 |
| 4,548,213 A | 10/1985 | Phillips | | |
| 4,600,019 A | 7/1986 | McBroom | | |
| 4,759,680 A * | 7/1988 | Simpson, III | ................. | 414/418 |
| 4,892,505 A | 1/1990 | Shrawder | | |
| 4,943,260 A * | 7/1990 | Fossum | ........................... | 460/96 |
| 5,042,240 A * | 8/1991 | Rocca et al. | ................... | 56/16.6 |

(Continued)

FOREIGN PATENT DOCUMENTS

EP 109324 A * 5/1984

*Primary Examiner* — Árpád Fábián-Kovács
(74) *Attorney, Agent, or Firm* — Adrian D. Battison; Ade & Company Inc.

(57) ABSTRACT

A cart is towed behind a combine harvester for collecting corn cobs and includes a conveyer belt feeding into a system for separating cobs from residue to be discharged and a tank for receiving and transporting the cobs. An unload auger is provided from the tank to one side of the cart while the cart moves forward. Power for driving the cart is obtained from a chopper drive of the combine harvester. The separating arrangement includes a suction fan or a single blower fan or a series of blower fans for blowing air through material from a conveyor and into a spreading guide which disperses the residue. The cobs are conveyed using a series of augers where the auger to flight distance is at least 2 inches and particularly a pair of augers feed the cobs through a front wall of the tank so as to push cobs upwardly into the tank.

31 Claims, 28 Drawing Sheets

U.S. PATENT DOCUMENTS

| | | |
|---|---|---|
| 5,256,106 A | 10/1993 | Shrawder |
| 5,941,758 A | 8/1999 | Flamme |
| 5,941,768 A * | 8/1999 | Flamme ............ 460/114 |
| 6,358,141 B1 | 3/2002 | Stukenholtz |
| 6,632,135 B2 * | 10/2003 | Matousek et al. ............ 460/23 |
| 7,524,242 B2 * | 4/2009 | Stukenholtz et al. ......... 460/115 |
| 2009/0095662 A1 * | 4/2009 | Redekop et al. ............ 209/509 |
| 2009/0104952 A1 * | 4/2009 | Redekop et al. ............ 460/80 |

* cited by examiner

HARVESTER CORN COBS SEPARATING

This application claims the benefit under 35 U.S.C. 119 of Provisional Applications Nos. 60/986,438 filed Nov. 8, 2007 and 61/087,409 filed Aug. 8, 2008, the disclosures of which are incorporated herein by reference.

This invention relates to agricultural harvesting machines and including a device to separate the corn cobs from the residue discharged from a combine when harvesting corn. The arrangement described and claimed herein can be towed behind a combine harvester to directly receive the material from the combine harvester or may be towed separately after the combining action is complete and includes a pick-up at the front of the inlet conveyor in order to pick up the material from the ground.

BACKGROUND OF THE INVENTION

World ethanol production is expected to experience double-digit growth in the next years. Much of the growth is expected to occur in the United States where, with the current pace of expansion, the United States will be the leading producer of ethanol in the near future.

In the United States, ethanol is made almost exclusively from corn. As of December 2006, 16% of the United States corn crop was being used to displace 3% of the nation's annual gasoline consumption. The US government has a stated goal of reducing its dependence on foreign oil by 20%. If this reduction were to come entirely from corn based ethanol it would use up the nation's corn crop. As a result there has been a considerable amount of research in the production of ethanol from other sources.

Government and private sector scientists have been working on ways to produce ethanol from cellulosic material. Ethanol produced from switch grass, mixed prairie grasses and woody plants grown on marginal land could potentially meet the growing demand for green fuel. One leading company has targeted the collection of corn cobs—a current waste material—as a cellulosic ethanol feed stock.

Corn Cobs have been used in the manufacture of a great number of items in the past, however in the last 10 years interest in corn cobs has waned. There is currently no commercially available equipment to collect corn cobs and a very small number of people that have built equipment to collect cobs themselves. The residue from the corn harvesting process after the shelled corn kernels have been extracted in the combine harvester includes the cobs and the remaining crop residue which is called herein "stover".

Current methods to collect cobs are very crude. A small number of farmers have built equipment to be mounted or pulled behind their combines.

Problems with existing technology:

Heavy cart behind combine—17000 lbs—combines are designed to pull a maximum of 10000 lbs;

Cleaning methods are not sophisticated enough to properly collect all cobs so there is a large amount of wasted cobs;

The operator has to stop harvesting to empty the cart.

One solution includes a collection tank mounted above a combine's grain tank—making the additional load too high and too heavy for current combines; this will be very difficult to be made commercially available with the diverse number of combine designs manufactured over the last 20 years.

The following prior patents are relevant to this field:

U.S. Pat. No. 6,358,141 Stukenholtz issued Mar. 19, 2002 discloses a collection system on a combine harvester with at least two on-board bins and appropriate cob separation equipment is detailed on the harvester itself.

U.S. Pat. No. 5,941,768 Flamme issued Aug. 24, 1999 discloses a cob collection unit which is pulled behind the combine to collect on a first conveyor all the residue discharged from a combine. A separation unit behind the conveyor includes a second conveyor and utilizes a fan to suck the stover off of the cobs as they are released from the top of the second conveyor and to blow the stover back onto the field. The heavier cobs are conveyed by a third conveyor belt up into the top of a collection tank. A fan housing is located at the rear end of the first conveyor, and the residue is sucked through the fan inlet and blown out of the fan outlet The disclosure of this patent is incorporated herein by reference.

U.S. Pat. No. 5,256,106—Shrawder—A combine is improved to reduce corn cobs to usable segments by adjusting clearances and a conveyor is added behind the cleaning shoe.

U.S. Pat. No. 4,892,505—Shrawder—A combine is improved to reduce corn cobs to usable segments by adjusting clearances and a conveyor is added behind the cleaning shoe.

U.S. Pat. No. 4,600,019—McBroom—A sieve is designed for a combine to allow the passage of corn and corn cobs through.

U.S. Pat. No. 4,548,213—Phillips—A corn cob sieve is shown with its geometry designed to allow passage of corn and corn cobs through.

U.S. Pat. No. 4,188,160—Corbet—A residue saver is shown that is mounted behind the combines sieve. The residue saver can be adjusted to save all materials or only large residue such as corn cobs. The saved residue is blown into a trailing wagon.

U.S. Pat. No. 3,680,291—Soteropulos—A corn harvesting machine is depicted which harvests and chops up both the corn and the stover. The grain is stored in a tank, and the stover is stored in a second tank or spread back on the ground.

U.S. Pat. No. 3,640,055—Looker—A two row self propelled corn picker is shown with a blower mounted behind the corn header to blow loose material out of the side of the machine. The husks are blown away as they drop from an elevated picker head. Side panels project upward and outward from the sides of the conveyor and a specially constructed blower is mounted above the bottom conveyor for directing streams of air laterally. As the crop slides down the side panels it is cleaned of trash with counter flowing streams of air.

U.S. Pat. No. 2,822,811—Slavens—A corn husking machine is detailed where the corn ear is picked and husked. A fan is used to blow and separate the husks from the ear corn.

SUMMARY OF THE INVENTION

It is an object of the present invention to provide an arrangement which may have some improvements over the patent of Flamme mentioned above.

According to a first aspect of the invention there is provided an apparatus for collecting corn cobs discharged from a rear of a combine harvester when used to harvest corn, the apparatus comprising:

a wheeled cart having a hitch coupling;

a conveying arrangement having an inlet for collecting material discharged from the combine harvester;

a separating arrangement for separating cobs from residue to be discharged;

and a tank for receiving the cobs from which the residue has been separated;

wherein the separating section includes at least two stages with the second stage following the first stage and receiving the cobs from the first stage;

wherein the first stage includes a first conveyor arranged to raise the residue material to an upper end of the conveyor from which the residue material is discharged into an open space from which the cobs fail downwardly for collection;

wherein the second stage includes a second conveyor arranged to receive at a lower end material from the first stage and to raise the residue material to an upper end of the conveyor from which the residue material is discharged into an open space from which the cobs fall downwardly for collection;

wherein the first and second stages each include a system generating an airflow through the open space such that materials in the residue having a higher surface area to weight ratio are carried in the air stream to a discharge location and materials in the residue including the cobs having a lower surface area to weight ratio fall downwardly for collection;

and wherein the systems in the first and second stages include a common fan generating the air stream Preferably the apparatus is arranged to be towed behind a combine harvester to directly receive the material from the combine harvester. However the apparatus may instead be towed separately after the combining action is complete and includes a pick-up at the front of the inlet conveyor in order to pick up the material from the ground Preferably the stages are arranged such that the air velocity passing through the space in the first stage is lower than in the second stage.

Preferably the common fan is a suction fan arranged to draw the materials in the residue having a higher surface area to weight ratio into the fan for discharge.

Preferably the fan has a discharge guide section for discharging the collected material from the first and second stages.

Preferably the discharge guide section is arranged to discharge to the sides from the suction fan.

Preferably the suction fan is located above the spaces of the first and second stages with an intake of the fan facing downwardly.

Preferably the first and second stages each include the conveyor thereof which is inclined upwardly with an upper end at discharging upwardly into the space.

Preferably the air stream is arranged to pass between the conveyors of the first and second stage and between the conveyor of the second stage and a transfer mechanism for transferring the cobs to the tank.

Preferably there is provided a hood for receiving the air from the stages and wherein the hood is shaped to provide a venturi effect at a front end of hood to draw the air from the combine harvester into the hood.

Preferably the conveyors are belt conveyors.

According to a second aspect of the invention there is provided an apparatus for collecting corn cobs discharged from a rear of a combine harvester when used to harvest corn, the apparatus comprising:

a wheeled cart having a hitch coupling;

a conveying arrangement having an inlet for collecting material discharged from the combine harvester;

a separating arrangement for separating cobs from residue to be discharged;

and a tank for receiving the cobs from which the residue has been separated;

wherein the separating section includes at least two stages with the second stage following the first stage and receiving the cobs from the first stage;

wherein the first stage includes a first conveyor arranged to raise the residue material to an upper end of the conveyor from which the residue material is discharged into an open space from which the cobs fall downwardly for collection;

wherein the second stage includes a second conveyor arranged to receive material from the conveyor of the first stage and to raise the residue material to an upper end of the conveyor from which the residue material is discharged into an open space from which the cobs fall downwardly for collection;

wherein the first and second stages each include a system generating an airflow through the open space;

and wherein the airflow in the first and second stages is generated by at least one suction fan for drawing the materials in the residue having a higher surface area to weight ratio into an inlet of the suction fan.

Preferably air flow velocity in the first and second stages is adjustable.

Preferably air flow trajectory in the first and second stages is adjustable.

Preferably air flow velocity or trajectory in each of the first and second stages are independently adjustable.

Preferably air expelled from the combine is captured in the air flow in the first and second stages and redirected.

Preferably there is provided a hood for receiving the air from the stages and wherein the hood is shaped to provide a venturi effect at a front end of hood to draw the air from the combine harvester into the hood.

Preferably the stages are arranged such that the air velocity passing through the space in the first stage is lower than in the second stage.

Preferably the first and second stages each include the conveyor thereof which is inclined upwardly with an upper end discharging upwardly into the space.

Preferably a single suction fan is common to the first and second stages.

Preferably the single suction fan has a discharge guide section for discharging the collected material from the first and second stages.

Preferably the discharge guide section is arranged to discharge from the suction fan to the sides of the cart.

Preferably the suction fan is located above the spaces of the first and second stages with an intake of the fan facing downwardly.

Preferably the air stream is arranged to pass between the conveyors of the first and second stage and between the conveyor of the second stage and a transfer conveyor.

According to a third aspect of the invention there is provided an apparatus for collecting corn cobs discharged from a rear of a combine harvester when used to harvest corn, the apparatus comprising:

a wheeled cart having a hitch coupling;

a conveying arrangement having an inlet for collecting material discharged from the combine harvester;

a separating arrangement for separating cobs from residue to be discharged;

and a tank for receiving the cobs from which the residue has been separated;

wherein the separating section includes at least two stages with the second stage following the first stage and receiving the cobs from the first stage;

wherein the first stage includes a first conveyor arranged to raise the residue material to an upper end of the conveyor from which the residue material is discharged into an open space from which the cobs fall downwardly for collection;

wherein the second stage includes a second conveyor arranged to raise the residue material to an upper end of the conveyor from which the residue material is discharged into an open space from which the cobs fall downwardly for collection;

wherein the first and second stages each include a system generating an airflow through the open space such that materials in the residue having a higher surface area to weight ratio are carried in the air stream to a discharge location and materials in the residue including the cobs having a lower surface area to weight ratio fall downwardly for collection;

and wherein the stages are arranged such that the air velocity passing through the space in the first stage is lower than in the second stage.

BRIEF DESCRIPTION OF THE DRAWINGS

Embodiments of the invention will now be described in conjunction with the accompanying drawings in which.

In the drawings like characters of reference indicate corresponding parts in the different figures.

DETAILED DESCRIPTION

Figure 1:
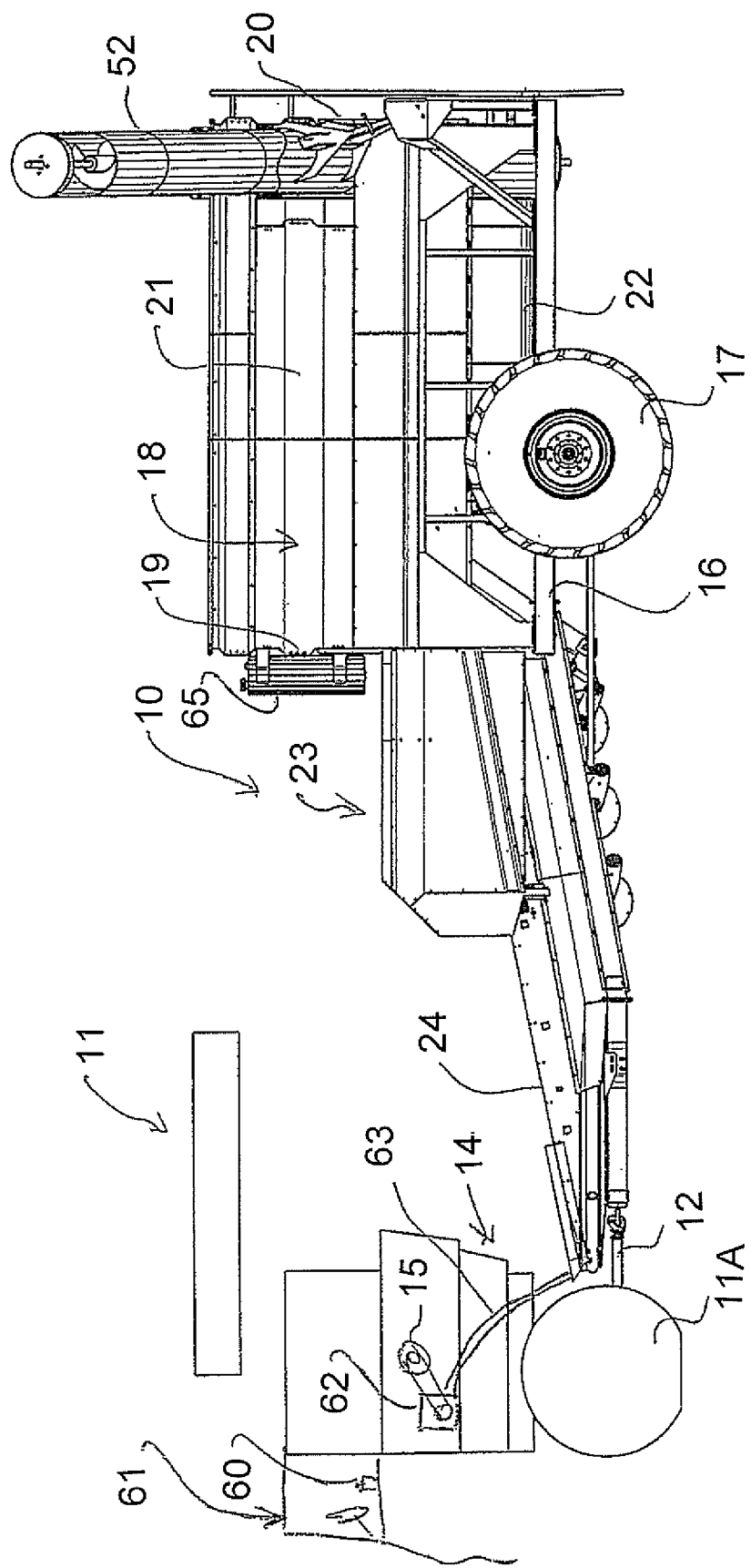
FIG. 1 is a side elevational view of a cob harvesting machine according to the present invention attached to a combine harvester.
Figure 2:
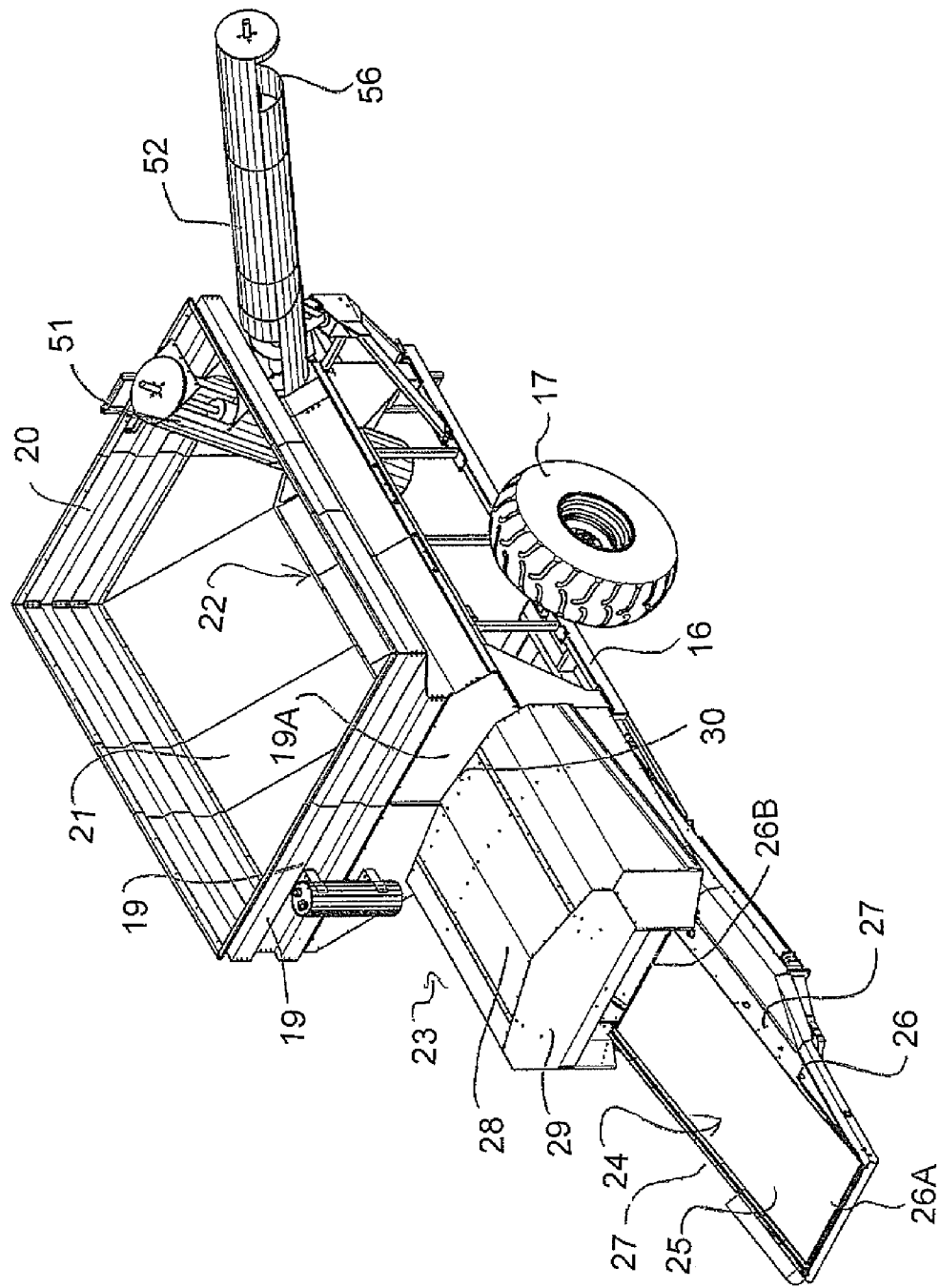
FIG. 2 is an isometric view from the top and one side of the machine of FIG. 1.

A cob harvesting system is generally indicated at 10 and is arranged to be towed behind a combine harvester 11 having a rear ground wheel 11A and a hitch indicated at 12. The combine harvester has at the rear end a discharge system generally indicated at 14 where crop residue is ejected and is commonly arranged to be deposited on the ground behind the combine harvester or distributed in a spread pattern.

The combine harvester may therefore include a chopper at the rear end where the chopper is for the purposes of use of this machine removed or moved to a near inoperative location. The chopper includes a chopper drive output pulley generally indicated at 15.

The cart 10 includes a frame 16 carried on ground wheels 17. The frame 16 carries a tank 18 with a front wall 19, a rear wall 20 and side walls 21 converging to a base 22. The tank is arranged longitudinally of the frame with the base 22 providing a discharge arrangement longitudinally of the base so that the collected materials can be carried along the base to one end for discharge.

In front of the tank 18 is provided a separating section generally indicated at 23. In front of the separating section 23 is provided a conveyor 24 which carried the collected materials from the combine rearwardly into the separating section.

The conveyor 24 comprises a conveyor belt 25 carried on rollers 26 or a slide surface mounted on side frame members 27 of the conveyor section. The conveyor rollers 26 include a front roller 26A which is located at a position at the combine harvester so that the discharged crop materials including the cobs and additional separated materials are collected on the forward end of the conveyor and are conveyed upwardly and rearwardly to a rear end of the conveyor belt at rear roller 26B.

The separating section 23 includes a covering hood 28 with a front wall 29 at the rear of the conveyor 24. The hood has a rear wall 30 located at the front wall 19 of the hopper. The hood 28 extends outwardly beyond the sides of the conveyor 24 to depending side walls 31 and 32 are respective sides of the hood.

Figure 4:
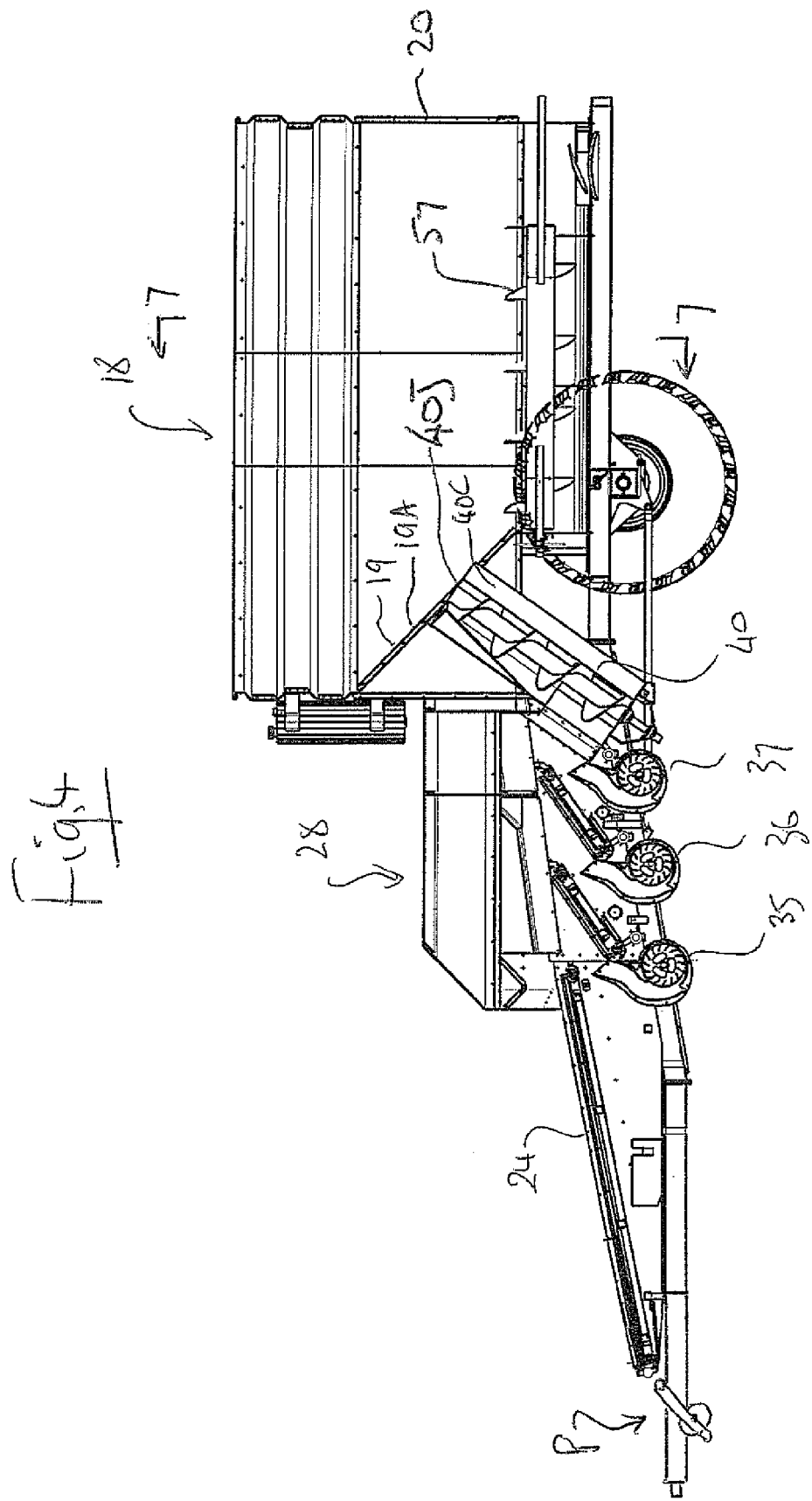
FIG. 4 is a longitudinal cross sectional view of the machine of FIG. 1 taken along the lines 4-4 of FIG. 7.
Figure 5:
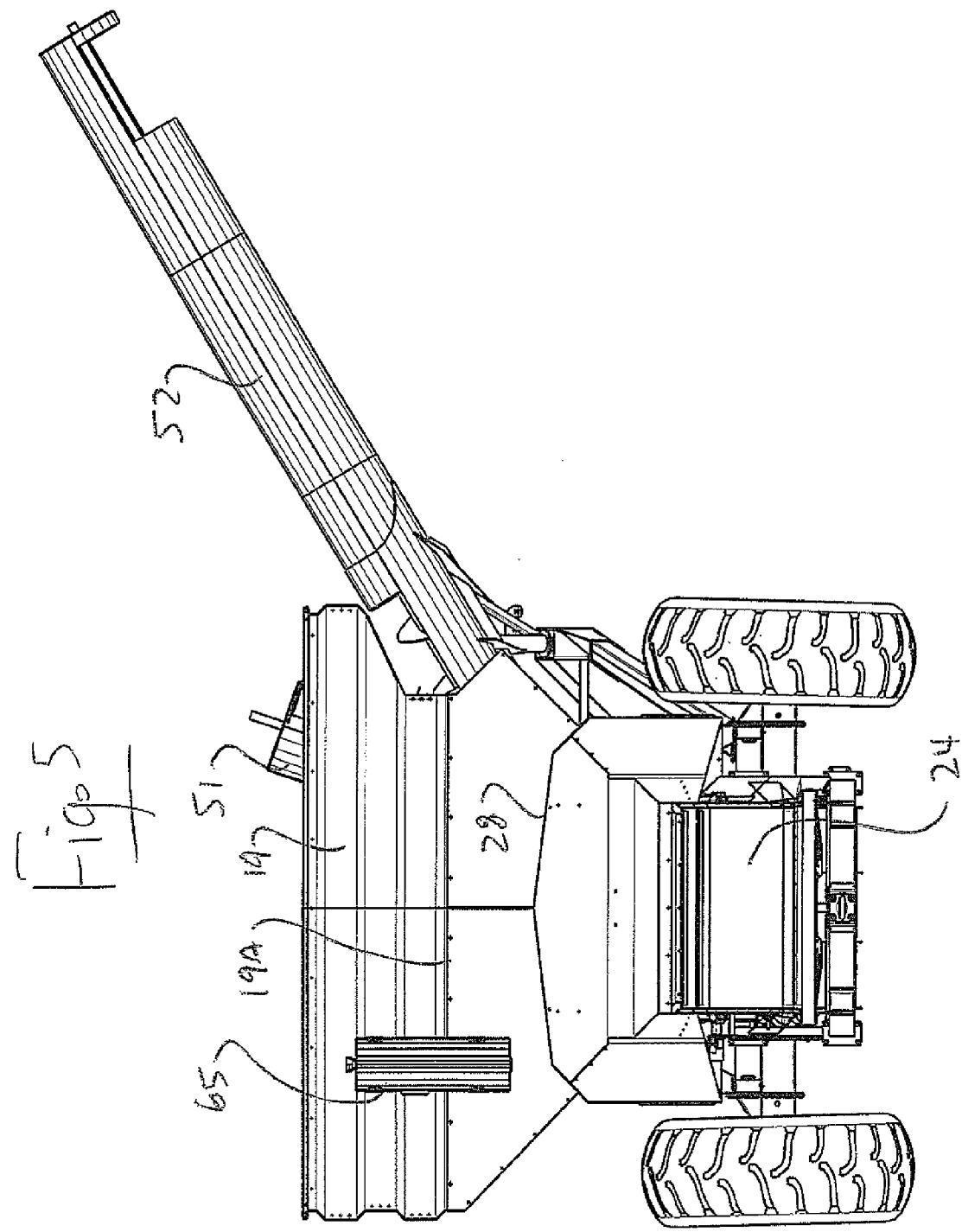
FIG. 5 is a front elevational view of the machine of FIG. 1.
Figure 6:
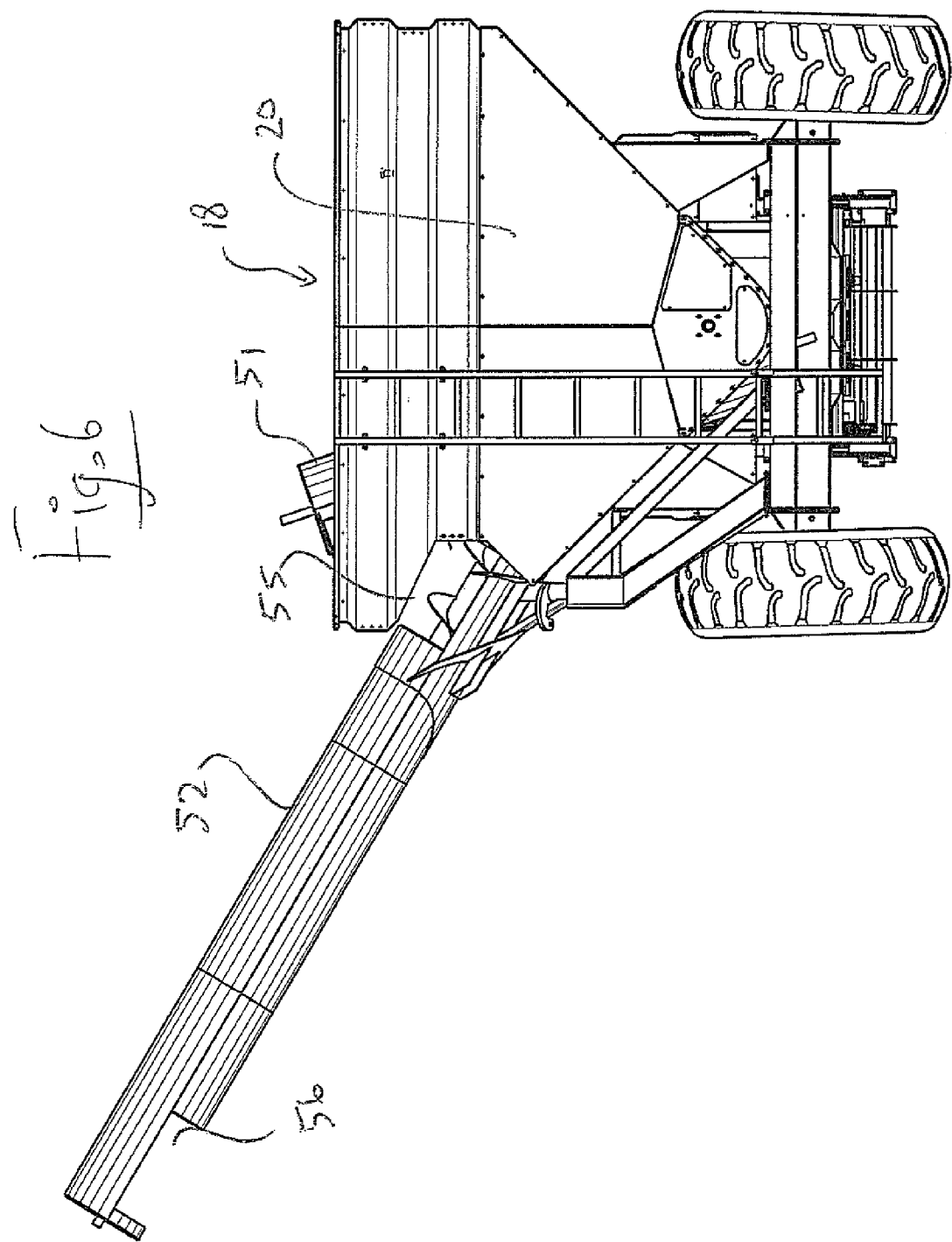
FIG. 6 is a rear elevational view of the machine of FIG. 1.
Figure 11:
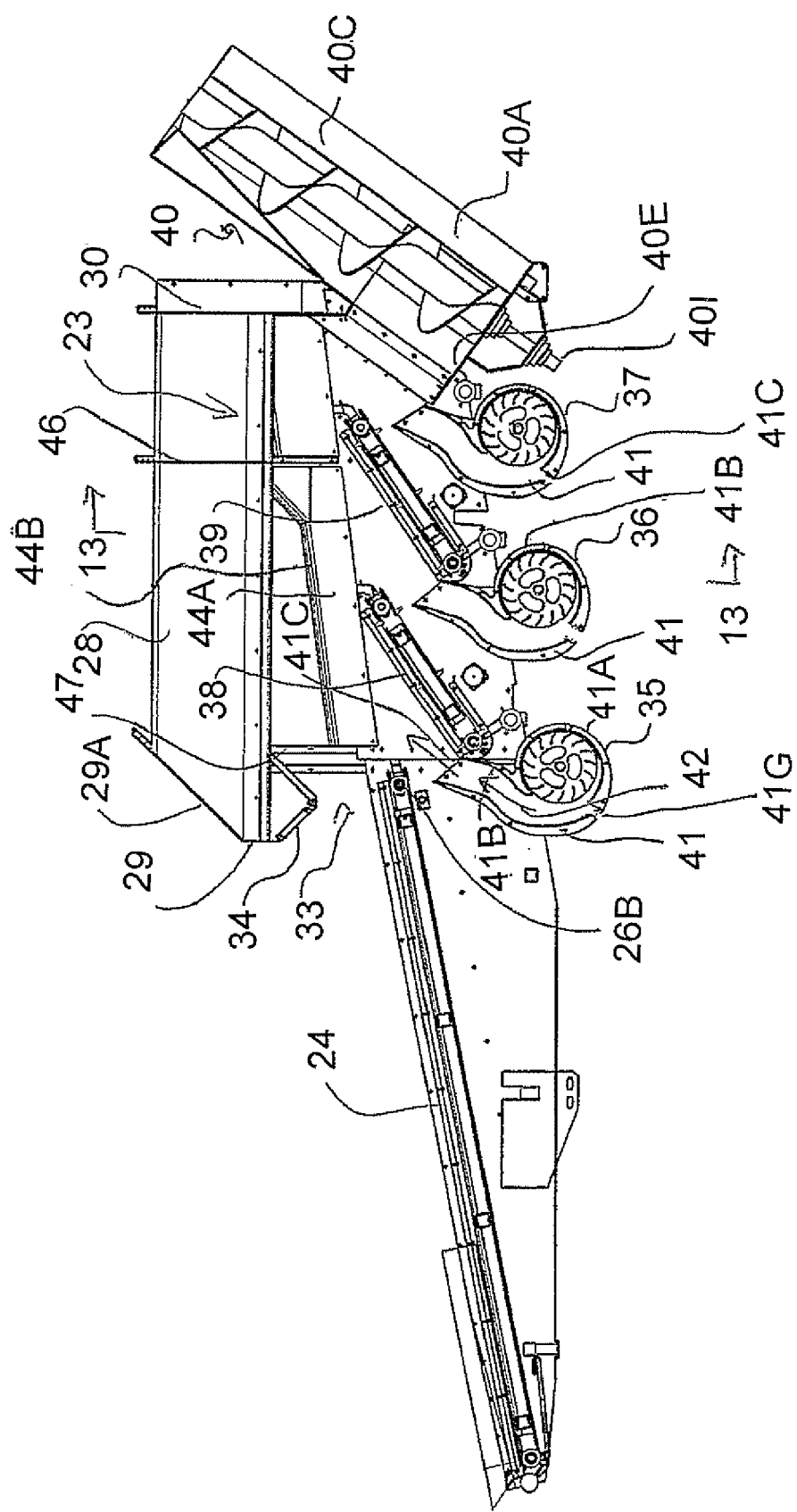
FIG. 11 is a cross sectional taken along the same lines as FIG. 4 view of the separating and conveying section as shown in FIG. 9.
Figure 12:
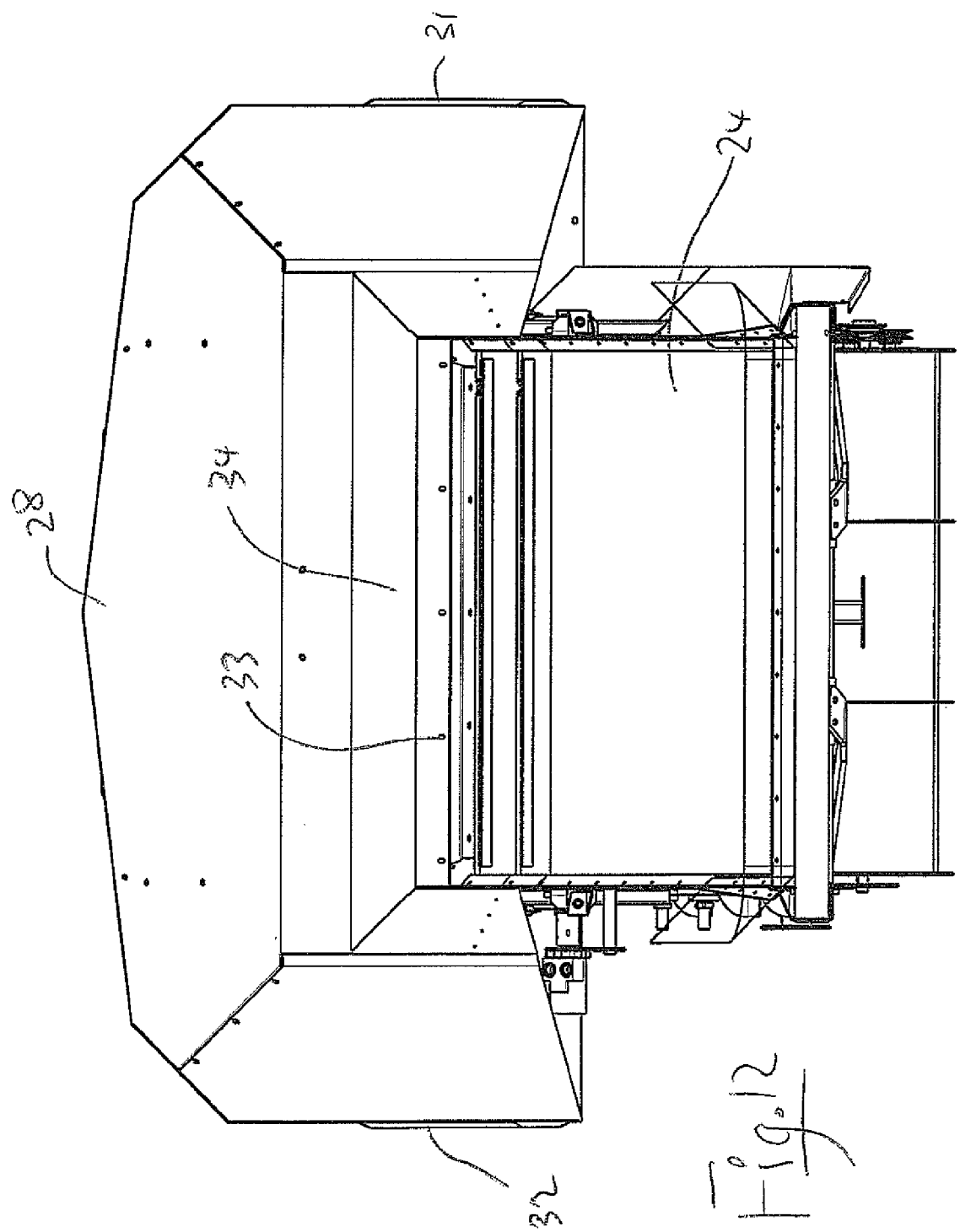
FIG. 12 is an end elevational view of the separating and conveying section as shown in FIG. 8.

As best shown in FIGS. 4 and 11 which show the separating system in cross section, a the rear end of the conveyor 24 there is provided an opening 33 at the front wall 29 of the hood 28 which includes a restriction member 34 which is of V-shape and extends downwardly toward the rear end roller 26B of the conveyor so as to form an air inlet across the width of the rear of the conveyor but that air inlet is restricted so as to form a venturi effect acting to draw the material through the opening 33 into the area under the hood 28.

The separating section 23 includes three blowers 35, 36 and 37 together with three additional conveyors 38, 39 and 40. Each blower, 35, 36 and 37 includes a duct guide for the air expelled from the blower as indicated at 41 so that the air from the blower across the full width of the cylindrical blower is carried tangentially from the blower and then upwardly and rearwardly along a path 42 through an opening inclined upwardly and inwardly so that the air stream generated by the blower tends to move upwardly and rearwardly into the area under the hood 28. Each blower co-operates with a rear end of a respectively one of the conveyors 24, 38, and 39 so that the material reaching the end of the respective conveyor is discharged into a respective open space underneath the end of the conveyor through which the air stream passes. Each of the subsequent conveyors 38, 39 and 40 has a feed end located underneath the discharge end of the previous conveyor so that the material discharging from the rearward end of the previous conveyor falls through the air stream with heavier materials landing on the inlet end of the subsequent conveyor and lighter materials being pushed upwardly into the area under the hood 28 above the respective conveyor.

Figure 13:
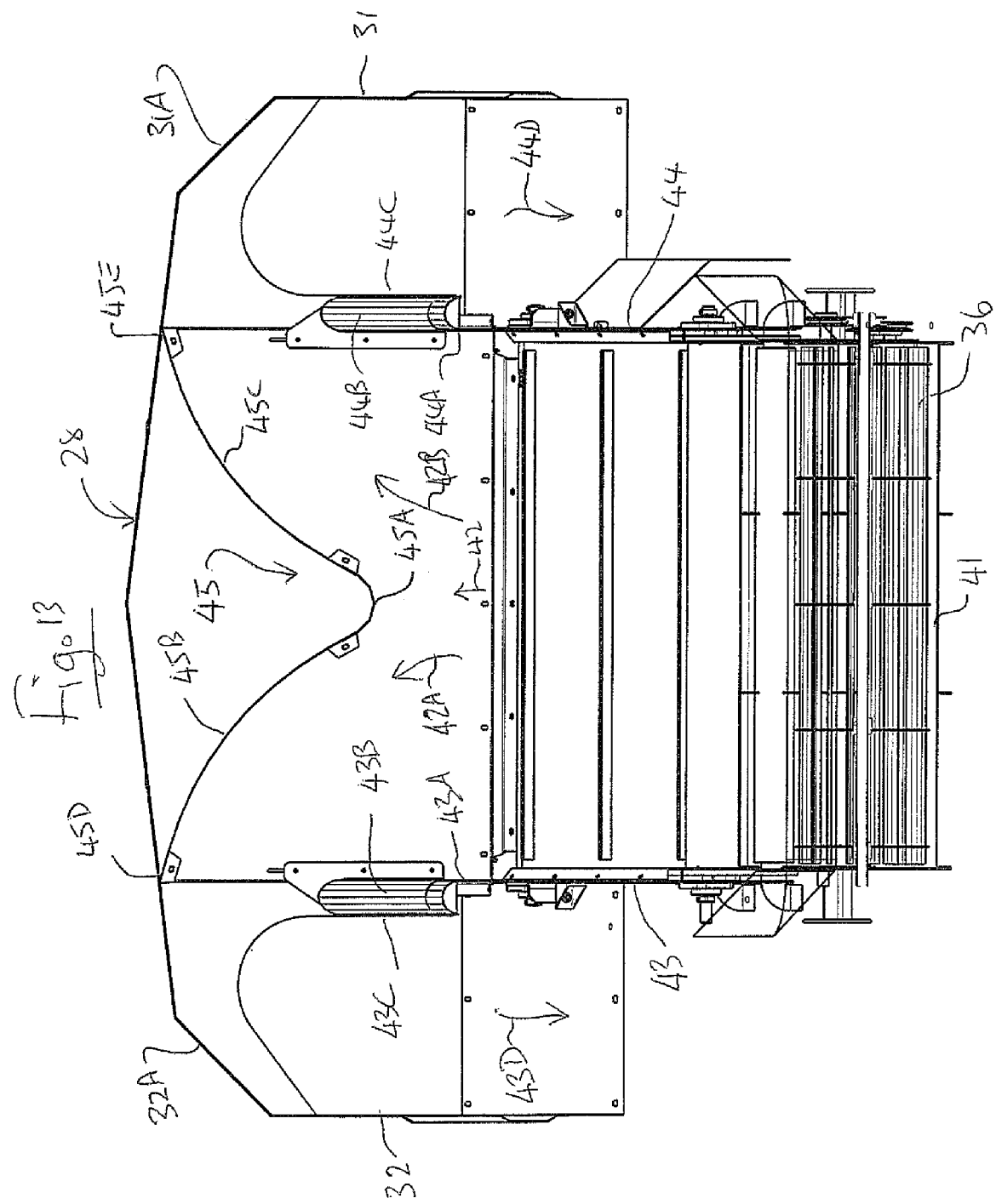
FIG. 13 is a cross sectional view of the separating and conveying section taken along the lines 13-13 of FIG. 11.

Each of the blowers 35, 36 and 37 is cylindrical as best shown in FIG. 13 without a guide wall 41 guiding the air expelled by the cylindrical blower in the required path upwardly and rearwardly. The wall 41 also forms a cylindrical housing 41A surrounding the blower together with an inner wall 41B which guides the air into a nozzle 41C defining the air stream in the path 42. The wall 41B directs the air so that it enters the space underneath the discharge end of the previous conveyor at a position immediately above the feed end of the subsequent conveyor so that all of the material falling toward the inlet end of the subsequent conveyor passes through the air stream and air stream acts as a separation system based upon the ratio of weight to surface area of the materials in the air stream.

The effects of the air stream at each of the separation sections can be adjusted by adjusting the rate of rotation of the blower and by adjusting the position of the fan air trajectory.

The adjustments are preferably set so that the air velocity at the first separation section at the blower 35 is preferably of the lowest air velocity so as to effect the maximum extraction of the lighter materials without blowing out cobs so that the lighter materials are expelled upwardly into the forward end of the hood 28. The second and third separation sections are preferably of a higher air velocity since the amount of the lighter materials to be separated is now much reduced so that there is a reduced tendency to carry out cobs with the airflow and the residue therein.

As best shown in FIGS. 11 and 13, the width of the blowers is approximately equal to the width of the conveyors so that side walls 43 and 44 of the separation system confine the width of the material so that the material remains in the same width as it enters the conveyor 24. The side walls 43 and 44 extend upwardly into side wall portions 43A and 44A above the separation zones so that the material in the air streams in the separation sections remains confined inwardly of these wall portions as the material moves upwardly to a position underneath the hood 28. Each of the wall portions 43A and 44A includes an upper rolled section 43B and 44B which is smoothly curved from an inner edge at the wall portion outwardly approximately through 180° to an outer edge 43C, 44C. These wall portions 43A and 44A together with the top edges thus provide separating edges where the material remains to be collected onto the next conveyor if it fails to reach a position over the top edge 43B, 44B. If the material remains inside that edge it can fall backward into the system and be deposited on the next conveyor. If the material is sufficiently light to pass over this upper edge into the area outside the side walls 43 and 44 then this material on reaching that position is discharged outwardly and downwardly to a position at the side of the separating section within the side walls 31 and 32. The space between the side wall 43 and the side wall 32 thus defines a channel within which the material can fall downwardly and indicated at 43D. Symmetrically a channel is provided outside the wall 44 and indicated at 44D. In order to direct the air in the air stream coming from the respective blower so that air moves outwardly into these two channels 43D and 44D, there is provides a curved guide surface 45 which has a bottom nose 45A facing downwardly at the center of the hood so as to separate the upcoming air stream 42 into two sections 42A and 42B which move upwardly and outwardly into the respective sides. From the nose 45A, each side includes a concave curved wall portion 45B and 45C respectively which moves upwardly and outwardly to terminate at an edge 45D, 45E at the top wall of the hood. At that respective edge, the air is turned downwardly and outwardly by an upper portion 32A, 31A of the side walls 32 and 31 respectively. Thus the air moving upwardly on the path 42 is separated and moved outwardly and accelerated by the fact that the space between the edges 45D and 45E and respective side wall 43B and 44B decreases in cross section.

In this way lighter materials which are drawn in that air stream upwardly and outwardly can pass over the edges 43B and 44B and can be discharged outwardly and downwardly.

The blowers 35, 36 and 37 draw air into the cylindrical interior of each blower through a large intake 41B in the housing 41A across the width of the fan (from the 12.00 to 3.00 positions in the elevation as shown).

The high air velocity of the fans, discharging in a rearward direction, acts to create a venturi effect causing the air and residue discharged from the rear of the combine to be drawn into the separation chamber. This reduces the formation of the typical cloud of dust and particles behind the combine and acts to guide that air and trapped materials into the separation system to be carried into the hood 28 and onto the ground beside the machine.

Each blower 35, 36, 37 has its own duct defined by the wall 41 on one side and the wall 41B on the other side. The duct extends upwardly and rearwardly so that the fan or blower is below the area where the separation occurs at the mouth of the duct. The wall 41 starts at a position spaced from the periphery of the housing of the fan so as to leave a slot shaped gap 41G along the end of the housing at the position where the air leaves the fan to enter the duct which is of sufficient size to allow any cobs falling back into the duct to escape from the duct. This slot is provided to accommodate a situation where the fan stalls or the machine stalls or the flow is blocked in some way which reduces the air flow to a level where cobs can fall into the duct. In order to prevent those cobs being present in the fan when it re-starts or while it rotates with the risk of damage to the fan blades. The slot allows any cobs (or other material) falling back into the duct to escape from the duct rather than enter the fan.

The separation system therefore draws in air and residue and acts to separate the heavier cobs and related materials from the lighter particles and leaves which are to be discharged. Those materials are then discharged in a controlled stream over the edges 43B and 44B and into the discharge ducts 43D and 44B where they can be deposited effectively onto the ground on either side of the separation system.

Figure 9:
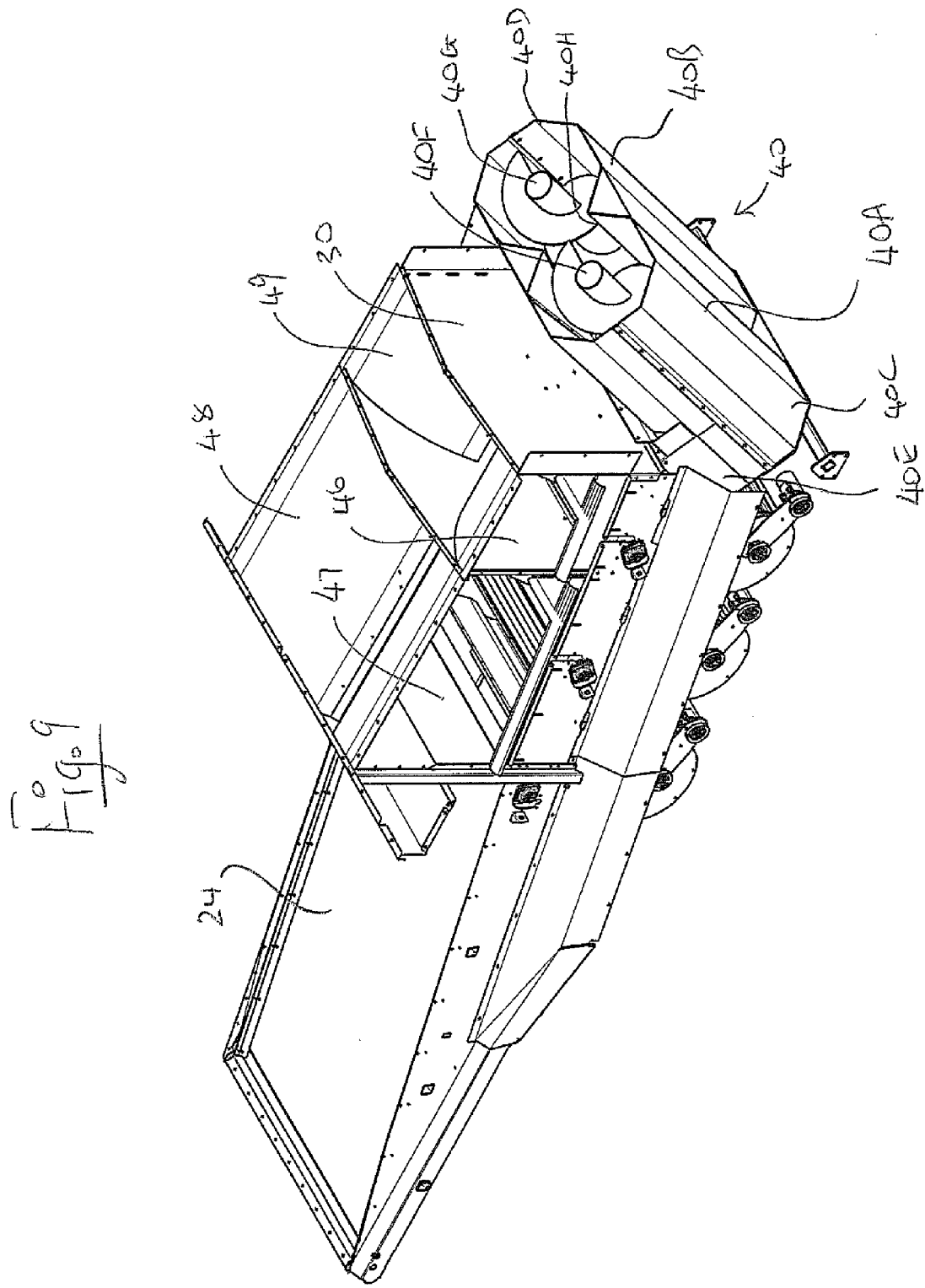
FIG. 9 is an isometric view from the same position as FIG. 8 of the separating and conveying section of the machine of FIG. 1 with the covers of the hood removed.
Figure 10:
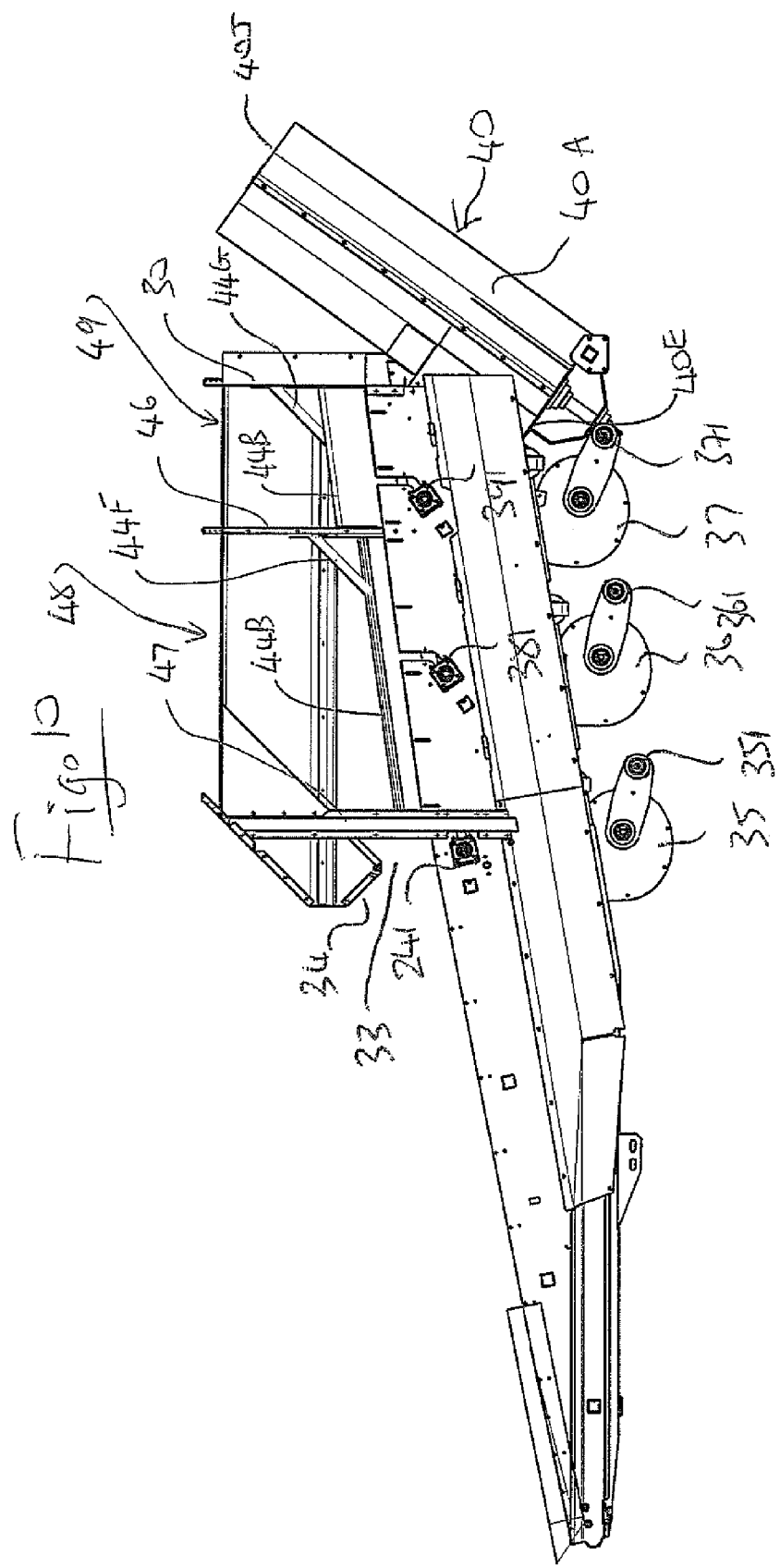
FIG. 10 is a side elevational view of the separating and conveying section as shown in FIG. 9.

The separation system includes an intermediate wall 46 parallel to the rear wall 30 and between the rear wall 30 and the front wall 29. The front wall 29 is inclined downwardly and forwardly as indicated at 29A so as to define a front edge at the venturi 33. Behind the front wall 29 is located a vertical wall 47 which is parallel to the wall 46 and defines with it the separating section at the forward end of the hood 28. Behind the wall 46 and in front of the wall 30 is provided a second separating section so that these are separated into two individual chambers as best shown in FIGS. 9 and 10. In these two chambers as indicated at 48 and 49, the separation occurs with a provision of the wall 46 acting to provide better control of the separation so that the majority of the separation occurs in the first section and a more fine separation can be controlled in the second section at the rear. It will be noted from these figures and particularly FIG. 10 that the side edges 43B and 44B are inclined upwardly and rearwardly parallel to a gradual incline of the separation system so that each of the separation sections is slightly above the previous separating section. However at a rear end of the side edge 44B there is provided an upwardly inclined section 44F which inclines upwardly and rearwardly as the wall 46. Thus the material tending to slide rearwardly on this edge 44B is prevented from pinching at the wall 46 and is better discharged from the separating edge 43B in the separating action. Similarly the upper edge 44B in the area of the second separation chamber 49 includes a rear portion 44G which is also inclined upwardly and rearwardly. It will be noted that the edge 44B in the second chamber 49 is raised above the edge 44B in the first chamber so as again to control more effectively the different separation effects within the two separate chambers.

Each of the conveyors 24, 38 and 39 is a belt conveyor mounted on supporting rollers having a width across the full width of the collection and separation systems. The conveyor 40, however, is defined by a pair of parallel augers 40A and 40B which are arranged side by side and are arranged to project upwardly and rearwardly through the front wall 19 of the tank 18. The parallel augers are best shown in FIG. 9 and comprise a pair of parallel tubes 40C and 40D leading upwardly and rearwardly from a feed hopper section 40E at the lower end. As shown in FIG. 11, the material discharge from the upper end of the conveyor belt 39 falls downwardly through the air stream of the blower 37 and if sufficiently heavy falls through the opening into the feed hopper 40E of the last conveyor arrangement 40. The inner hopper 40E divides into two sections each entering a respective one of the tubes 40C and 40D. Downstream of the hopper, the tubes 40C and 40D are arranged to surround two auger flights 40F and 40G each in a respective one of the tubes. In an area 40H between the tubes, the wall dividing the tubes is open to provide an area between the two auger flights which is open. Thus the tubes form a conduit surrounding the auger flights so that the cobs are carried upwardly and rearwardly by the auger flights so as to enter through the front wall 19 of the tank. The front wall 19 includes an inclined section 19A which is inclined downwardly and rearwardly to the bottom of the tank. The conduit formed by the tubes 40C and 40D is substantially at right angles to the inclined portion 19A so as to emerge through an opening 40J in the inclined portion 19A. Thus the auger flights feed the material upwardly and push the material into the tank. When the tank is empty, the material fed through the opening 40J simply slides down the inclined wall 19A to the base of the tank. As the tank begins to fill, the material builds up over the opening 40J and further material is pushed upwardly into the material already resting on the wall 19A. The material is thus fed into the tank without the material falling through air. It has been found that this method for filling the tank avoids the situation where discharge of the material over a top wall of the tank acts to spread the material unevenly in the tank since the material tends to separate based upon the weight to surface area ratio. Thus if material where to be fed over the top wall of a tank in a stream from a conventional belt conveyor, there is a tendency for the heavier cobs to fall at the rear of the tank and the lighter materials to fall at the front of the tank. This uneven filling makes discharge of the material from the tank more difficult and is better if the material is evenly spread through the tank by the filling system through the front wall as shown and described.

Figure 3:
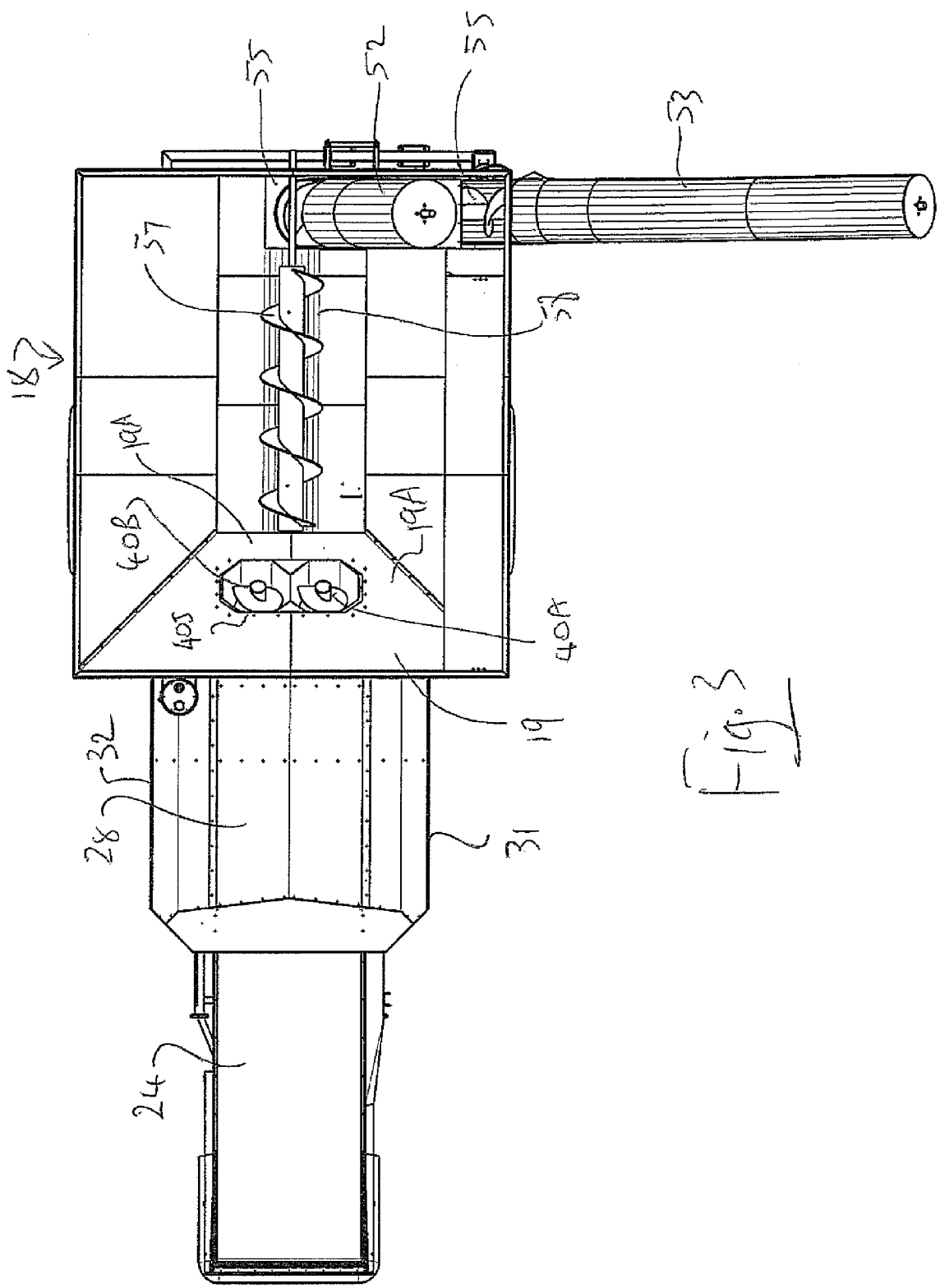
FIG. 3 is a top plan view of the machine of FIG. 1.
Figure 7:
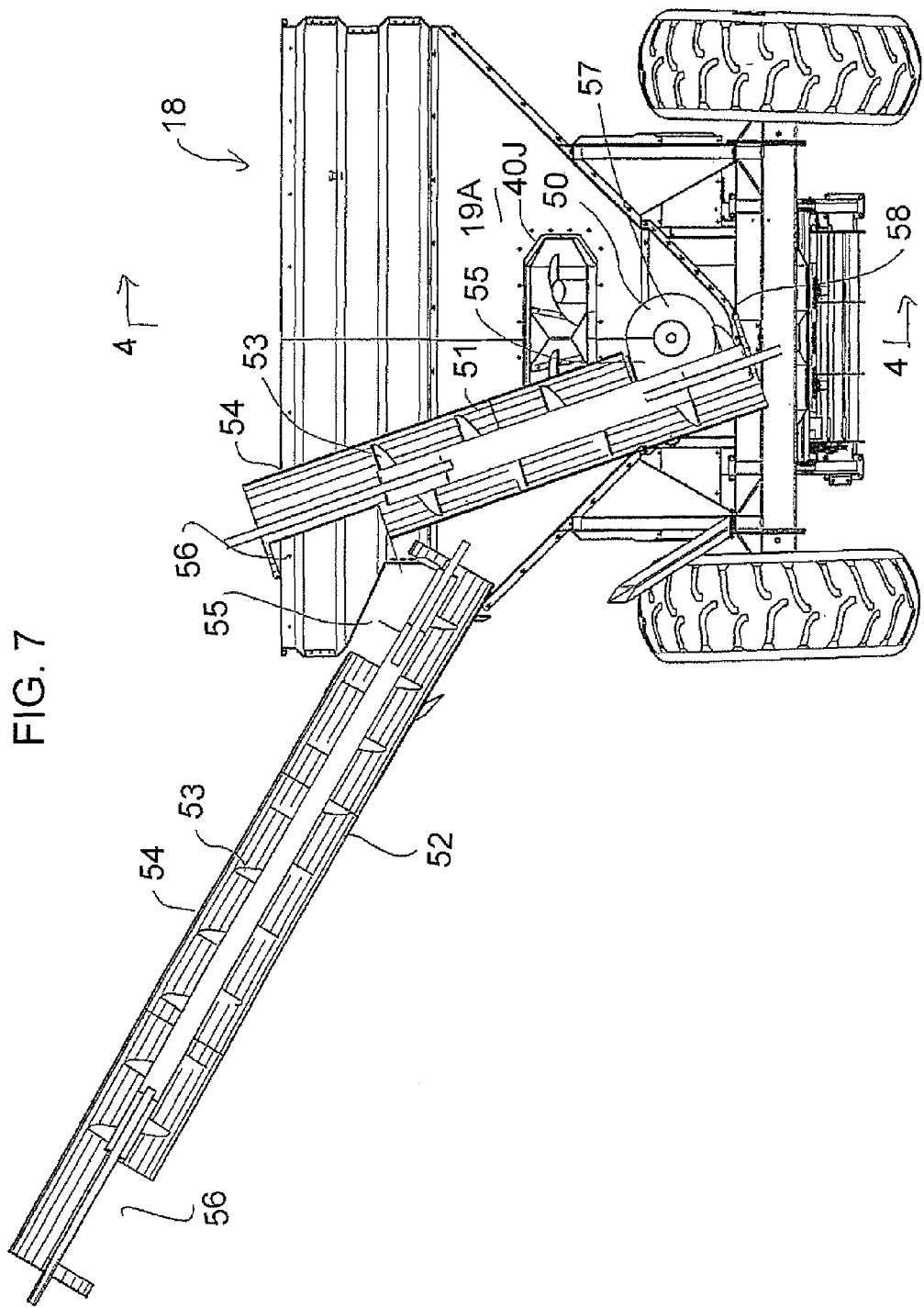
FIG. 7 is a transverse cross sectional view of the machine of FIG. 1 taken along the lines 7-7 of FIG. 4.
Figure 8:
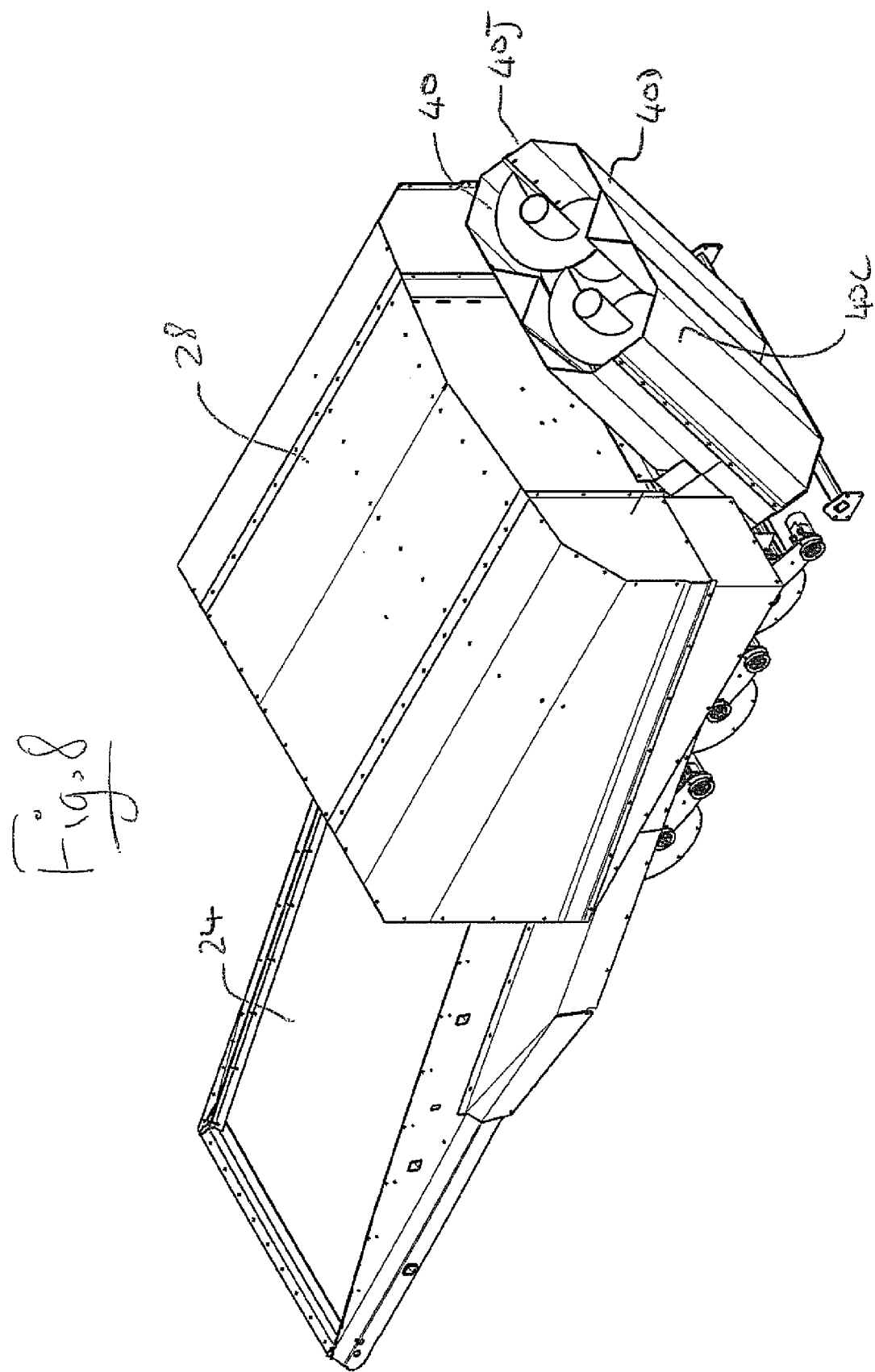
FIG. 8 is an isometric view from the top, rear and one side of the separating and conveying section of the machine of FIG. 1.

The tank includes a tank discharge system best shown in the plan view of FIG. 3 and the cross sectional view of FIG. 7. The discharge system includes a first discharge auger 50, a second lifting auger 51 and a third side discharge auger 52. Each of the augers 51 and 52 comprises an auger flight 53 mounted within a tube 54 and extends from a feed opening 55 to a discharge 56. The auger 52 projects through the side wall of the tank at a position adjacent the rear corner with the feed opening 55 located at that corner so that the auger tube extends outwardly to the sides of the tank to a sufficient distance to allow loading of a vehicle moving along side the tank with the discharge opening 56 projecting downwardly at the outer end of the auger tube. The auger 51 extends upwardly from the base at an angle so that the discharge opening 56 of that tube discharges into the open feed opening 55 on the tube 52. At the base, the auger 50 is not enclosed but includes an auger flight 57 which is located adjacent the curved base portion 58 of the bottom of the tank. The bottom of the tank includes a bottom hopper portion extending from the front wall 19A to the rear wall of the tank. The auger flight 57 is mounted within the hopper portion and carries the material along to the feed end 55 of the auger flight 51.

In order to properly deliver the corn cobs from the tank along the base by the auger flight 57 and through the augers 51 and 52, the clearance between an outer diameter of the auger flight and the closest part of a delivery tube is greater than two times the diameter of the cobs so as to leave a space between the edge of the flight and the tube to prevent pinching of the cobs in the space. Cobs are typically of the order of 1.0 to 1.5 inches in diameter so that a minimum spacing of 2 to 3 inches is desirable. However the spacing can be greater than two times the cob diameter so that it can be as much as four times leading to a maximum preferred spacing of 6 inches. The arrangement described herein can provide a large chase cart for use with the cob harvesting system whether a chase cart has the capacity of the order of 2.5 times the capacity of the tank 18. The cart should preferably have an unloading system of emptying the cart in less than 3 minutes.

Thus also the flighting 57 is spaced from the base of the tank by a similar distance which is selected to be four times the diameter of the typical corn cob. This allows the cobs to be quickly moved to the conveyor auger 51 along the bottom of the tank without binding or shearing and dramatically reduces power requires and stress on delivery tube and drive line.

The auger 52 is mounted for movement to a transport position using conventional cylinder and hinging arrangements which are well known to a person skilled in the art.

The unload mechanism defined by the three augers can be operated while the system continues to harvest and separate since these elements are independent of the separation system and the feed system of the conveyor 24 thus allowing the combine harvester to continue in operation and the collection of the cobs to continue while the temporarily stored cobs in the tank are discharged into the chase cart. For this purpose a switch 60 is provided in the cab shown schematically at 61 in FIG. 1.

Power for driving the various components on the cart is provided by a pump 62 mounted on the combine harvester at the chopper drive pulley 15. The pump 62 is driven therefore by the pulley so as to generate power for all the components of the cart. The pump is connected to the cart by hydraulic lines 63 which communicate with the various hydraulic motors for the components. Thus the blowers 35, 36 and 37 each have a hydraulic drive motor 351, 361 and 371. Thus each of the conveyors has a drive motor 241, 381 and 391. The final conveyor 40 also includes hydraulic drive motors 401. The discharge components in the tank also have hydraulic motors which are not visible. The hydraulic system includes a return tank 65 from which the fluid is returned to the pump 62 with the raised position of the tank 65 providing a head for pump of the drive system. The cart also includes a hitch coupling with a quick detachable hitch allowing the cart to be readily attached to and removed from the combine harvester when required. The hitch arrangement is not shown in FIGS. 1 through 13 but is shown in more detail in FIG. 21 as described hereinafter. The use of the quick detach hitch together with the use of the power from the combine to drive the cart allows a quick attach system by which the cart can be attached to the combine when the combine is harvesting corn but can be removed from the combine very quickly when the combine is used for harvesting other materials. As soon as the cart is removed, the drive to the pump 62 can be disconnected and the drive pulley 15 reconnected to the chopper which is also moved to the deployed position if required for use with the crop to be harvested.

In FIG. 4 there is shown a modification to the embodiment described above in which the cart is arranged to be towed behind a tractor and includes a pick-up generally indicated at P. Thus instead of collecting the material directly from the rear of the combine, the harvester is towed around the field after the combine has finished its work to pick up a swath of the discharged material from the combine. The pick-up is of a conventional nature of the type commonly used on a baler. Apart from this modification, the construction remains unchanged except that the power to the cart is provided by the hydraulic output of the tractor so that the pump 65 is not required.

The following description of further embodiments of the invention discloses elements and features which may also be used in the first embodiment described above.

Figure 14:
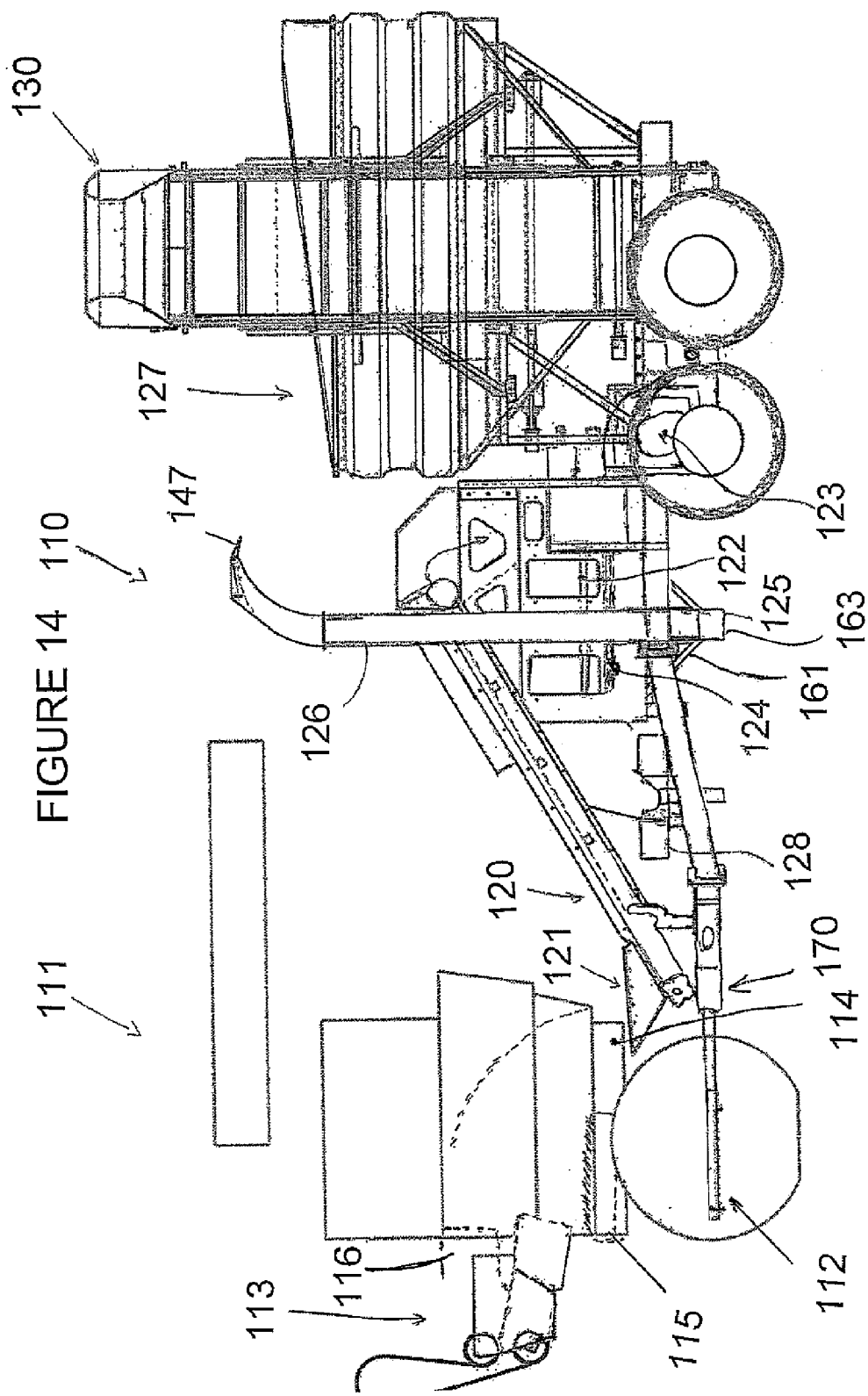
FIG. 14 is a side elevational view of a second embodiment of cob harvesting machine according to the present invention.
Figure 15:
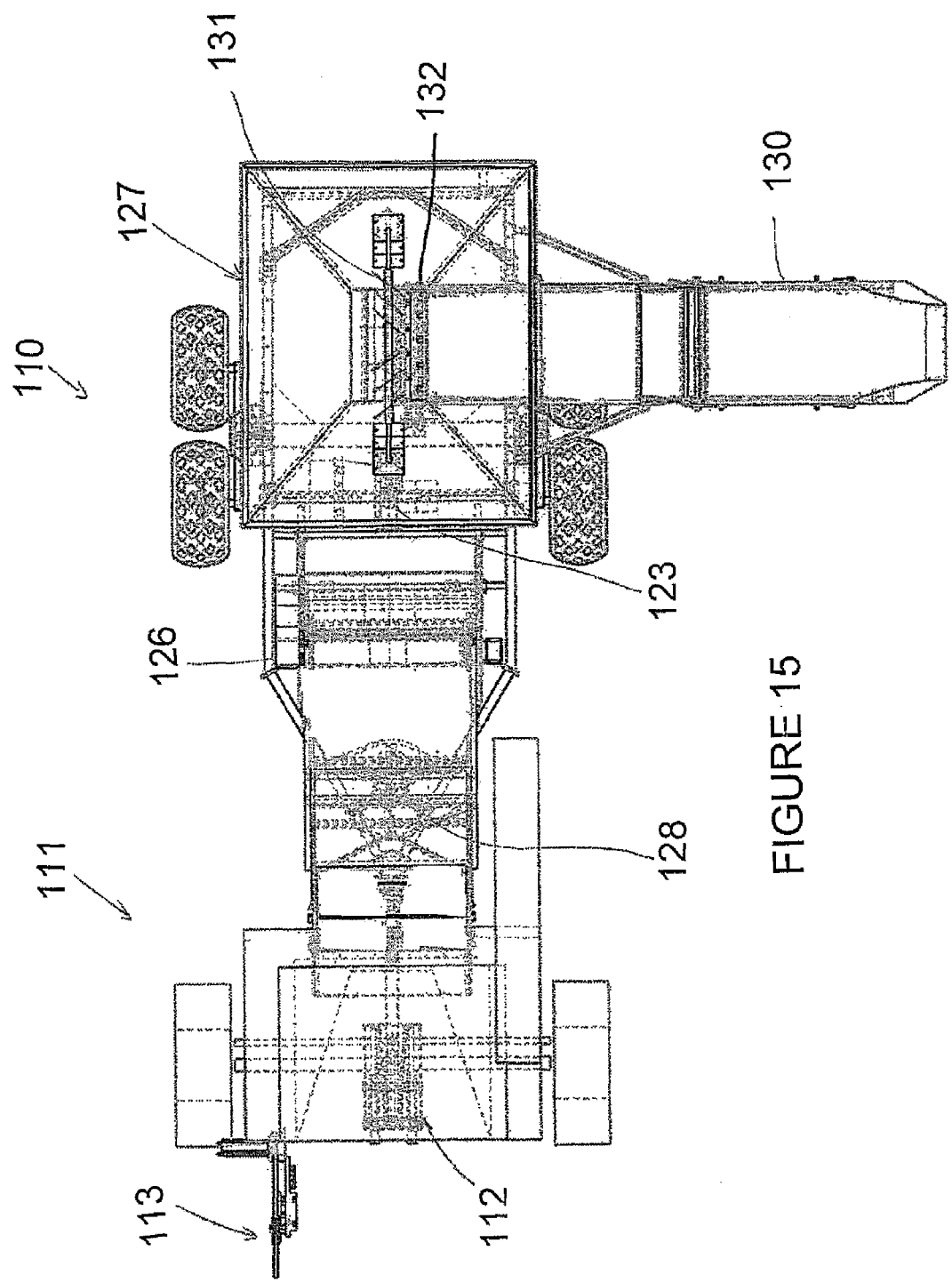
FIG. 15 is a top plan view of the machine of FIG. 14.

Referring to FIGS. 14 and 15, a corn cob harvesting machine 110 is pulled behind the rear end of a typical combine 111. The combine 111 is equipped with a specialized hitch 112 to quickly disconnect the cob harvesting machine, as it is a common practice to switch between harvesting corn and soybean on a daily basis dependant on the weather. The cob harvester is powered hydraulically by a drive system 113 taking power from combine's chopper drive.

The corn cob harvester includes an inlet conveyor 120 that has a feed hopper 121 placed under the combine's residue outlet 114. It is preferable that the residue from the sieves 115 as well as the walkers or rotors 116 (depending on combine type) be combined in the inlet conveyor's hopper to capture all possible cobs.

The inlet conveyor 120 elevates the residue and drops the residue onto the cob separating mechanism in the form of a sieve 122. The cob separating mechanism 122 includes a fan 123 for generating air velocity from a plenum 124 underneath the sieve 122 through the residue. The cobs fall through the separating device into a bottom trough 125 and are elevated through delivery tube 126 by air pressure into the collection tank 127. A spreading mechanism 128 in the form of a horizontal fan distributes the remaining undesired stover back out onto the field.

Figure 16:
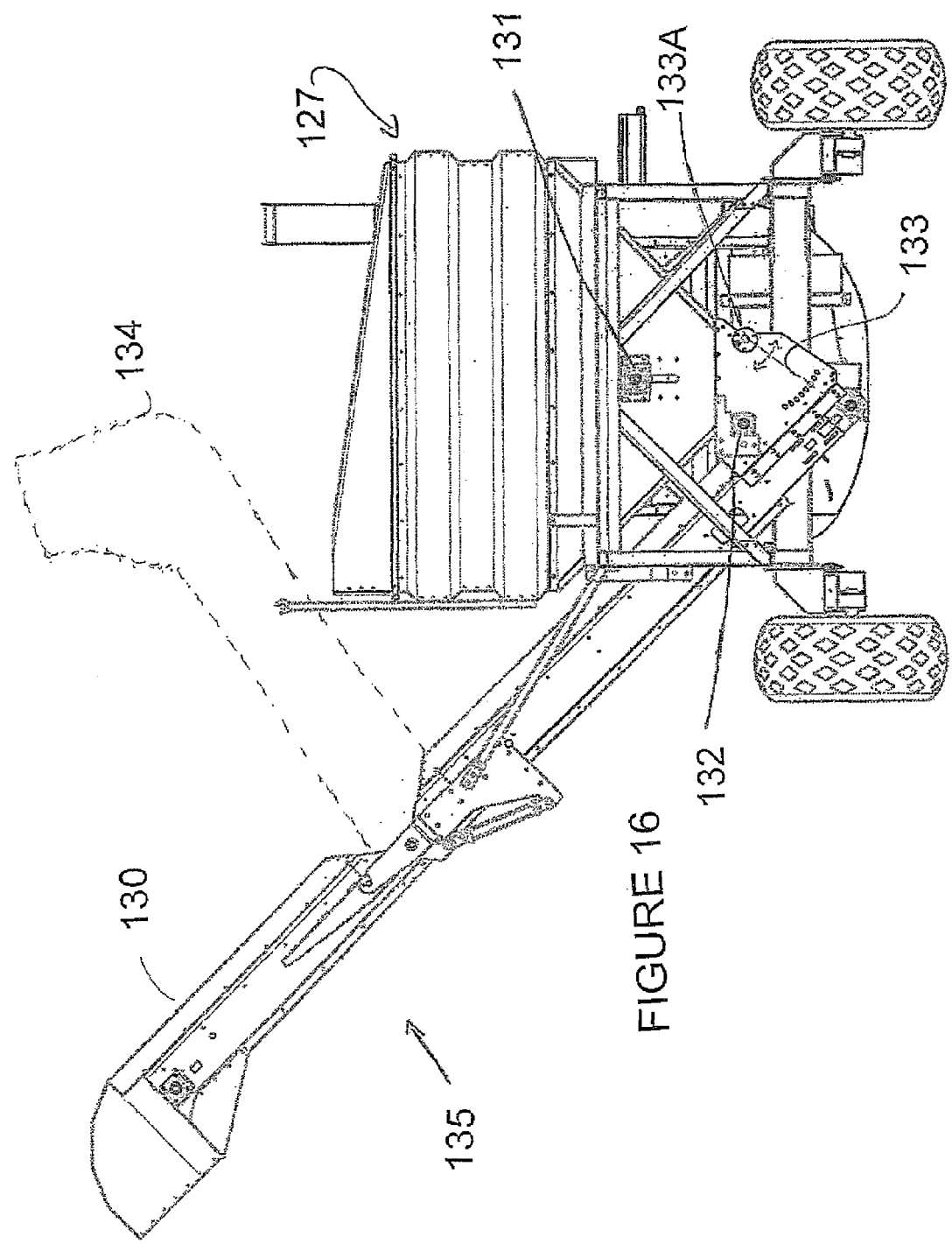
FIG. 16 is a rear elevational view of the machine of FIG. 14.

Referring to FIGS. 15 and 16, when the cobs fill the tank 127 the unload circuit may be activated from the combine operator's cab via an electrical switch. The unload conveyor 130 is first unfolded from a transport position 134 to the field working position 135 extending outwardly to one side of the tank. Once in position the conveyor can be operated. An agitation device 131 in the tank, in the form of a longitudinally extending rotary member which rotates about its longitudinal axis to engage the cobs with arms or fingers, keeps the cobs from bridging over the outlet conveyor. A metering drum 132 located just above the bottom of the outlet conveyor, turns slowly about an axis transverse to the conveyor belt while the conveyor discharges cobs from the tank. An adjustable metering jaw 133 which provides a plate mounted at its upper end at a height generally aligned with the metering drum and is adjustable in angle about a longitudinal axis at the upper mounting so that the lower end can pivot toward and away from the drum over the bottom end of the conveyor belt, works in conjunction with the metering drum to ensure that the conveyor is not overloaded.

Figure 17:
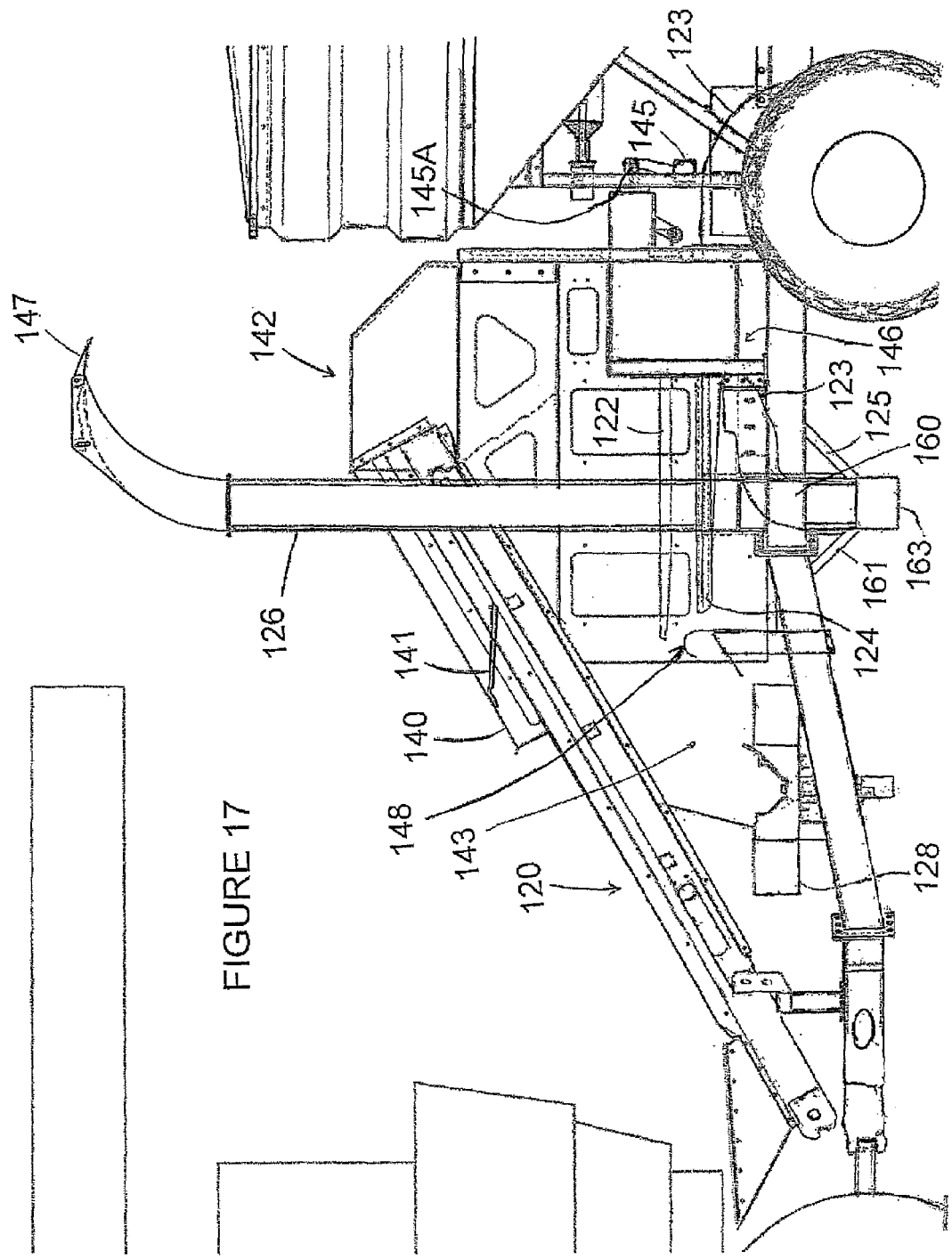
FIG. 17 is a side elevational view of the machine of FIG. 14 on an enlarged scale.

Referring to FIG. 17, the inlet conveyor 120 includes a hood 140 at its upper end prior to the separating mechanism 122 that incorporates an air seal 141 in the form of a flap inclined rearwardly of the conveyor that rides over the residue transported up the conveyor. The separating mechanism 122 is mounted in a chamber 142 which is sealed to ensure all generated air flows toward the spreader at the front exit 143 The separating mechanism 122 the form of the horizontal cob sieve is actuated by a motor 145 through a crank mechanism 145A in a generally horizontal oscillating motion. The trajectory and the stroke of the sieve oscillation are adjustable to enhance performance in various conditions. The angle of inclination of the sieve as well as the relative angle of the air plenum 124 as it directs air onto the sieve is adjustable. An adjustable fence 148 at a forward discharge end of the sieve 122 is used to fine tune the separation just before the stover which passes over the fence is spread with spreader 128.

Figure 18:
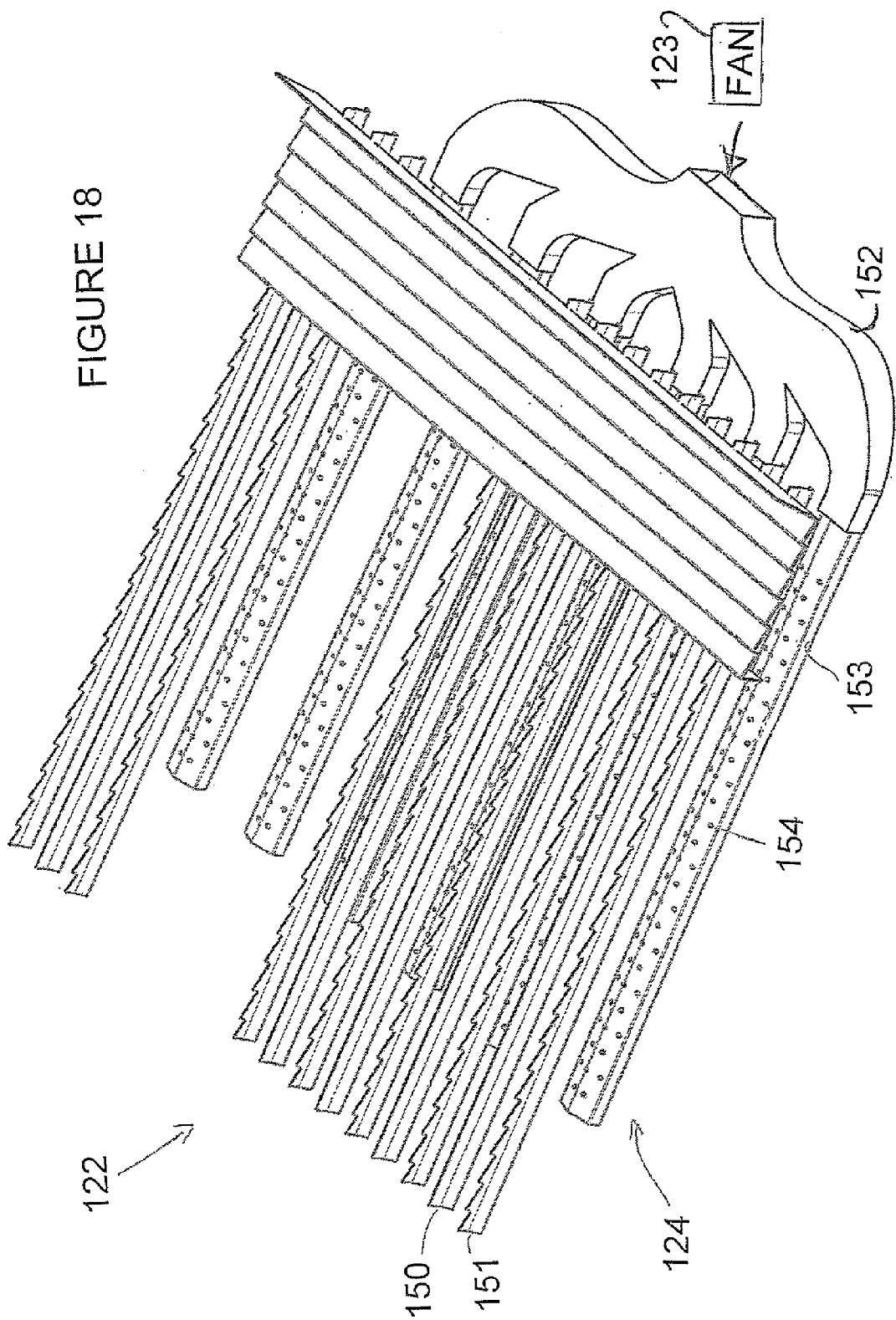
FIG. 18 is an isometric view of the separation section of the machine of FIG. 14.

As shown in FIG. 18, the sieve 122 is constructed of bars which extend longitudinally of the sieve toward the discharge end. The bars include alternating smooth 150 and jagged 151 bars as defined by a smooth or jagged upper edge of the bars. This arrangement acts to rotate the cobs to fall through the sieve if a cob happens to be lying perpendicular to the bars. The bars are not transversely fastened to each other in the cleaning zone to minimize any cobs catching on the mechanism.

The air plenum 124 is made up of an air divider 152 and a plurality individual, longitudinally extending, transversely spaced fingers 153 that allow the cobs to fall between the fingers into the separating hopper 125 below. The air from the divider passes into the hollow fingers and escapes upwardly toward the sieve through the exit holes 154.

FIG. 18 has a number of sieve bars omitted to more clearly show the air plenum. The holes 154 in the plenum fingers are of different sizes to create an even airflow across the entire cleaning area. The air velocity in the cleaning zone is widely variable with fan speed changes and the top plates forming the upper surfaces of the plenum fingers being quickly replaceable. The entire back end 146 of the air plenum is open along with a mesh bottom in the hopper 125 to allow additional air to be drawn along due to the venturi effect created with the air flowing out of the plenum fingers.

Figure 19:
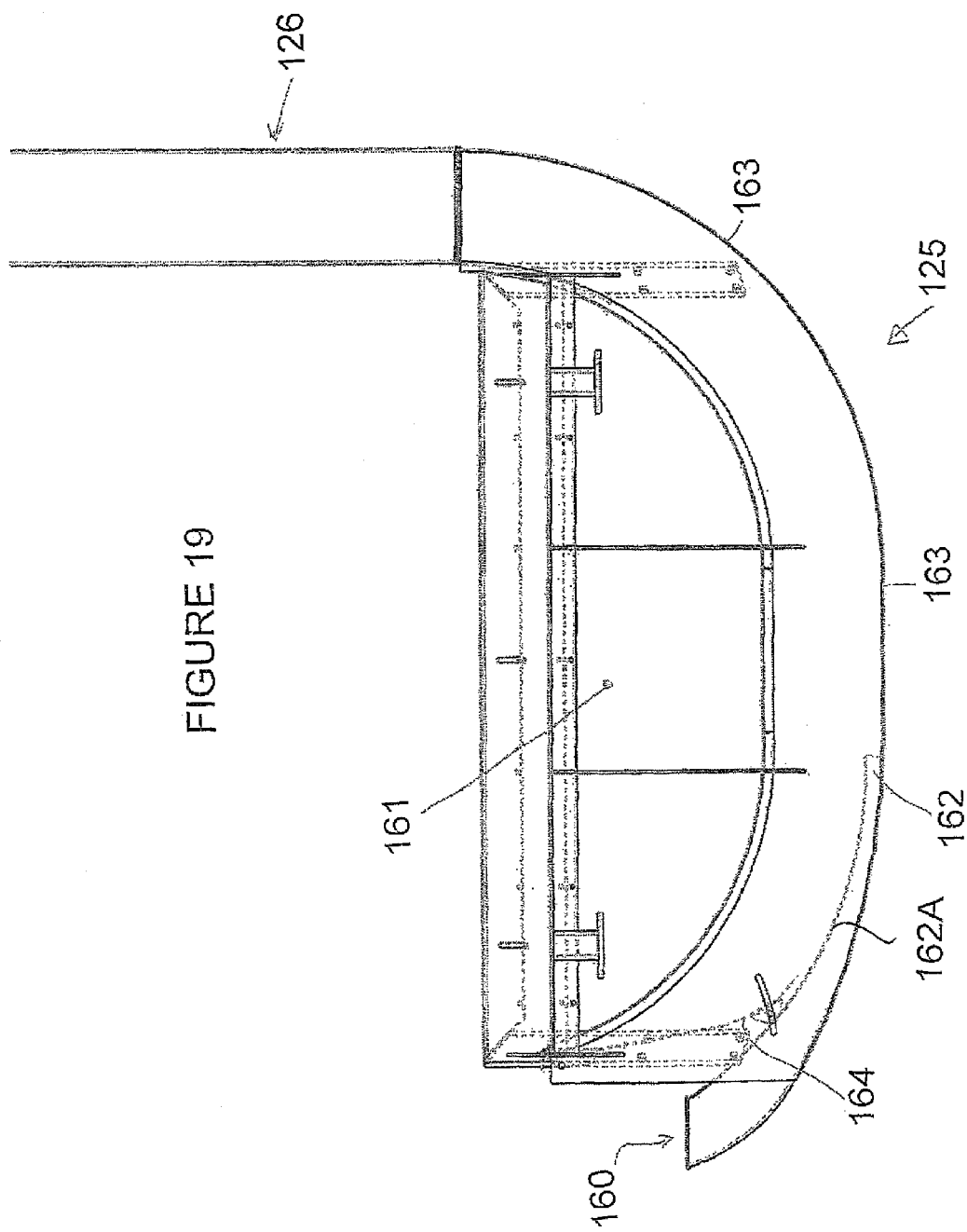
FIG. 19 is a transverse cross sectional view of the separation hopper of the machine of FIG. 14.

Air from the fan 123 is divided at the fan outlet and flows into both the cleaning plenum 124 and the bottom of the hopper 125 through inlet 160. As shown in FIG. 19 both angled bottom surfaces 161 of the hopper are made of screen to allow additive air to flow into the cleaning system from below. A venturi 162 though which the air passes from the inlet 160 is placed near the middle of the bottom curved surface 163 of the hopper to suck the cobs which collect at the bottom surface 163 into the air stream and propel them along the curved surface 163 and up into the vertical outlet pipe 126. The bottom 163 of the hopper 125 forms a recessed square cross section recessed below the bottom of the inclined walls 161 to help retain the air in the pathway across the surface 163 as it accelerates the cobs to the outlet pipe 126. The venturi 162 includes an air control flap 164 that serves to control velocity on top of the duct wall 162A forming the top of the venturi 162 thus keeping cobs moving to the outlet of the venturi at the middle of the bottom wall 163.

As shown in FIG. 17, the top of the outlet tube 126 includes an adjustable plate 147 to direct the cobs into the collection tank 127. From the end of this flap to the tank 127 a secondary separation of fine material from the cobs occurs. The heavy cobs drop into the tank and any remaining light material is carried with the air out of the back side of the tank.

Figure 20:
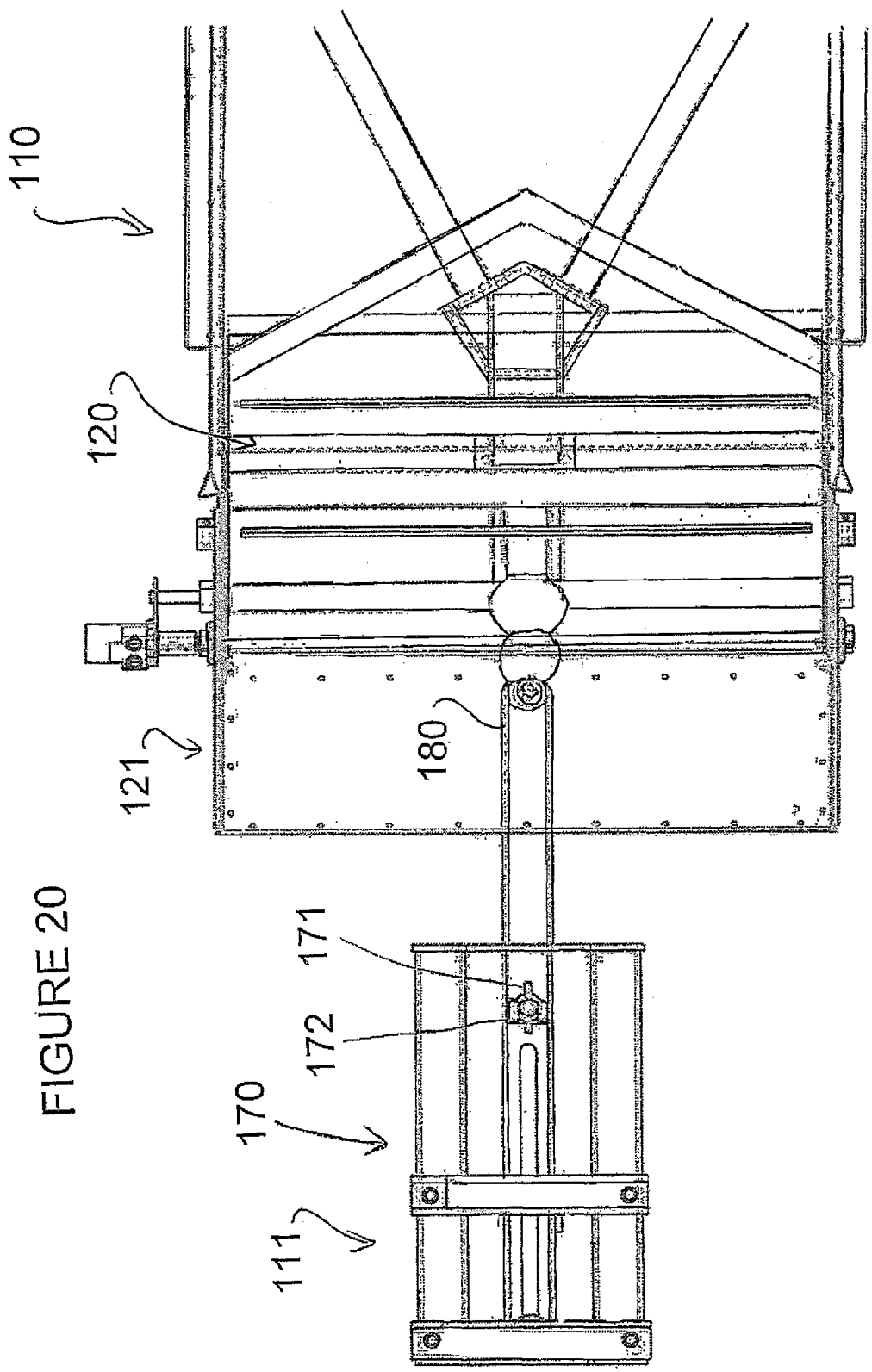
FIG. 20 is a top plan view of the machine of FIG. 14 showing the hitch coupling.

Some operators may need to disconnect the cob harvester to do the end rows in small fields since turning in tight spaces may be impossible with a trailing cart. Although easy to disconnect the cob harvester, it is much more difficult to reconnect since the operator is not be able to see the hitch from the combine cab. FIG. 20 shows a quick attach hitch 170 carried on the rear of the combine for attaching the cart to the combine in towing position. With the quick hitch the combine operator is able to manually connect the cart without requiring perfect alignment between the two machines.

To reconnect the cart the operator positions the combine within 2 ft of the cart. The center pin 171 of the hitch 170 can then be pulled upwardly from an engagement position to a release position and rotated a ¼ turn, at which position it is held up on a pin rest 172. The operator is then able to pull the hitch drawbar 180 out of the hitch receiver, toward the cart hitch, with the freedom of complete lateral movement. Once connected the operator turns the center pin 171 so it is ready to fall in place; then backs the combine into place. Hitch drawbar 180 slides back into the hitch receiver, pushing the harvester if necessary, until the drawbar is as shown and the pin drops. The operator then lifts the tongue jack and is ready to collect cobs once again. The quick connect hitch described above can be used in all embodiments described herein.

Figure 21:
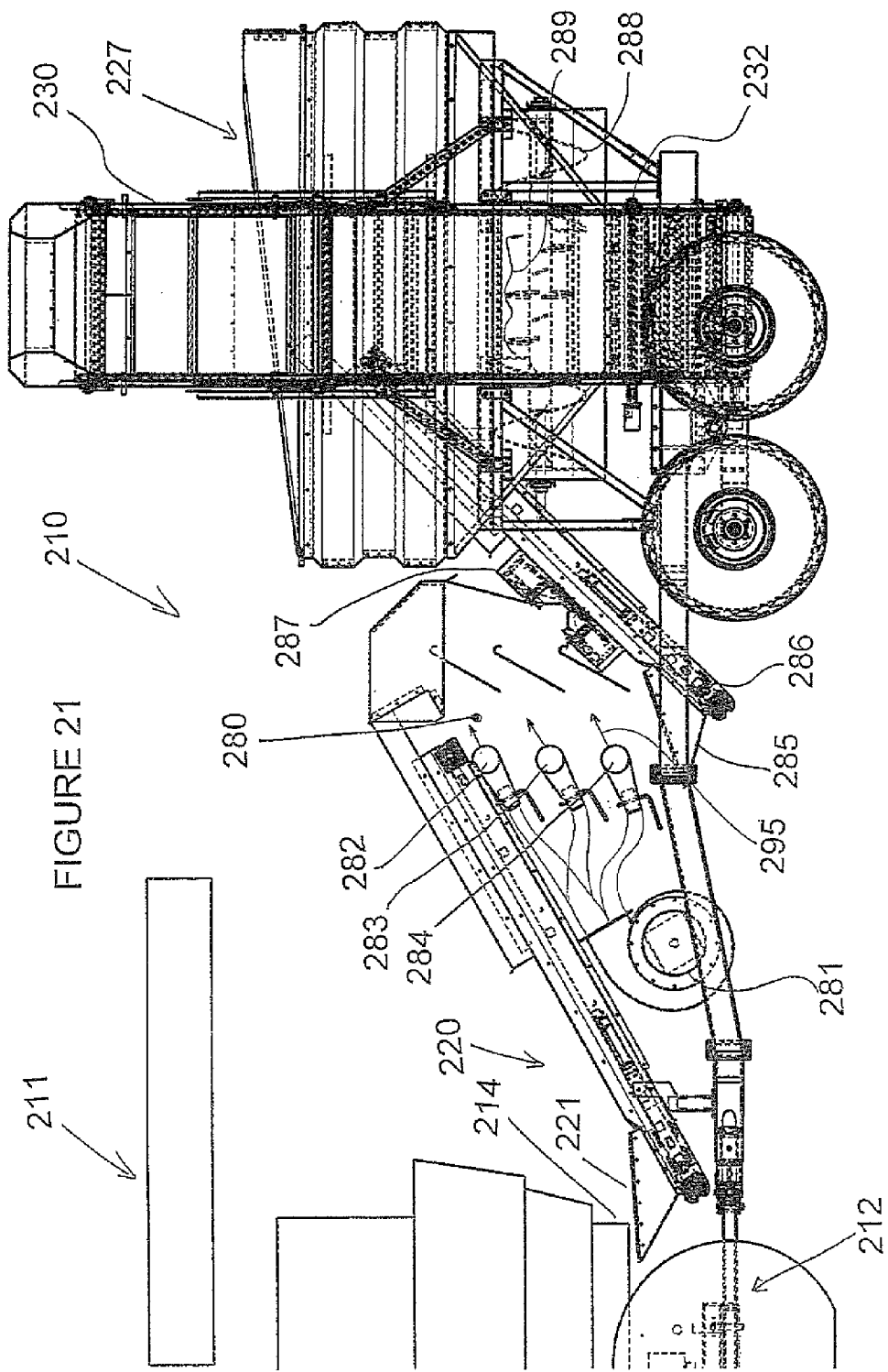
FIG. 21 is a side elevational view of a third embodiment of cob harvesting machine according to the present invention.

Referring now to the third embodiment shown in FIG. 21, a corncob harvesting machine 210 of the same general type as that disclosed above is pulled behind the rear end of the combine 211. The combine is equipped with a specialized hitch 212 of the arrangement previously described to quickly disconnect the cob harvesting machine. The cob harvester is powered hydraulically by a drive system (not shown) taking a drive outlet from the combine's chopper drive, again as previously described.

The corn cob harvester includes the inlet conveyor 220 that has its feed hopper 221 placed under the combine's residue outlet 214. It is preferable that the residue from the sieves as well as the walkers or rotors (depending on combine type) be collected in the inlet conveyor's hopper in order to capture all possible cobs.

The inlet conveyor elevates the residue and drops the stover into a cob separating region 280. The cob separating mechanism includes a fan 281 for generating air jets 295 from transverse plenums 82, 83, 84 through the stover. The cobs fall through the separating device into the hopper 285 of a second clean cob conveyor 286 at the bottom of the open space and are elevated by the second conveyor 286 to the collection tank 227. A rotating spinner type spreading mechanism 287 distributes the remaining undesired stover back out onto the field by accelerating the material dropped into the top of the spreader outwardly to the sides.

When the cobs fill the tank 227 the unload circuit may be activated from the combine operators cab via electrical switch. The unload mechanisms includes the unload conveyor 230 the metering drum 232 located just above the bottom of the outlet conveyor as previously described. The metering drum turns slowly while the conveyor discharges cobs from the tank to ensure the conveyor is not overloaded. In this embodiment a bottom cleanout auger 288 is added above the metering drum. The cleanout auger moves cobs inwardly from the front and rear of the tank toward the metering drum and includes a center agitation section 289 which engages the cobs as it rotates on the auger to ensure all the cobs in the tank flow smoothly into the metering area.

Figure 22:
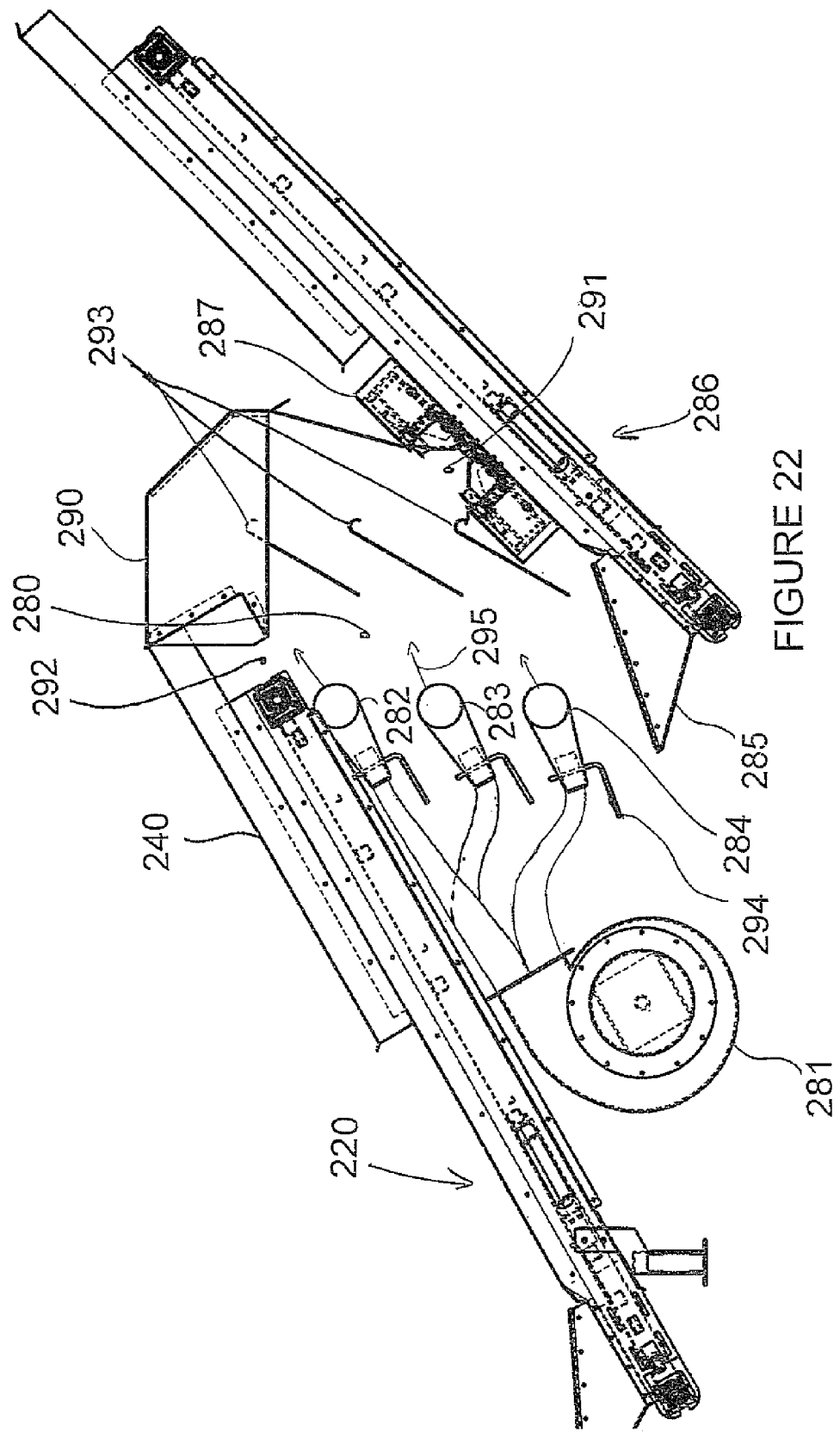
FIG. 22 is a side elevational view of a part only of the embodiment of FIG. 21.
Figure 23:
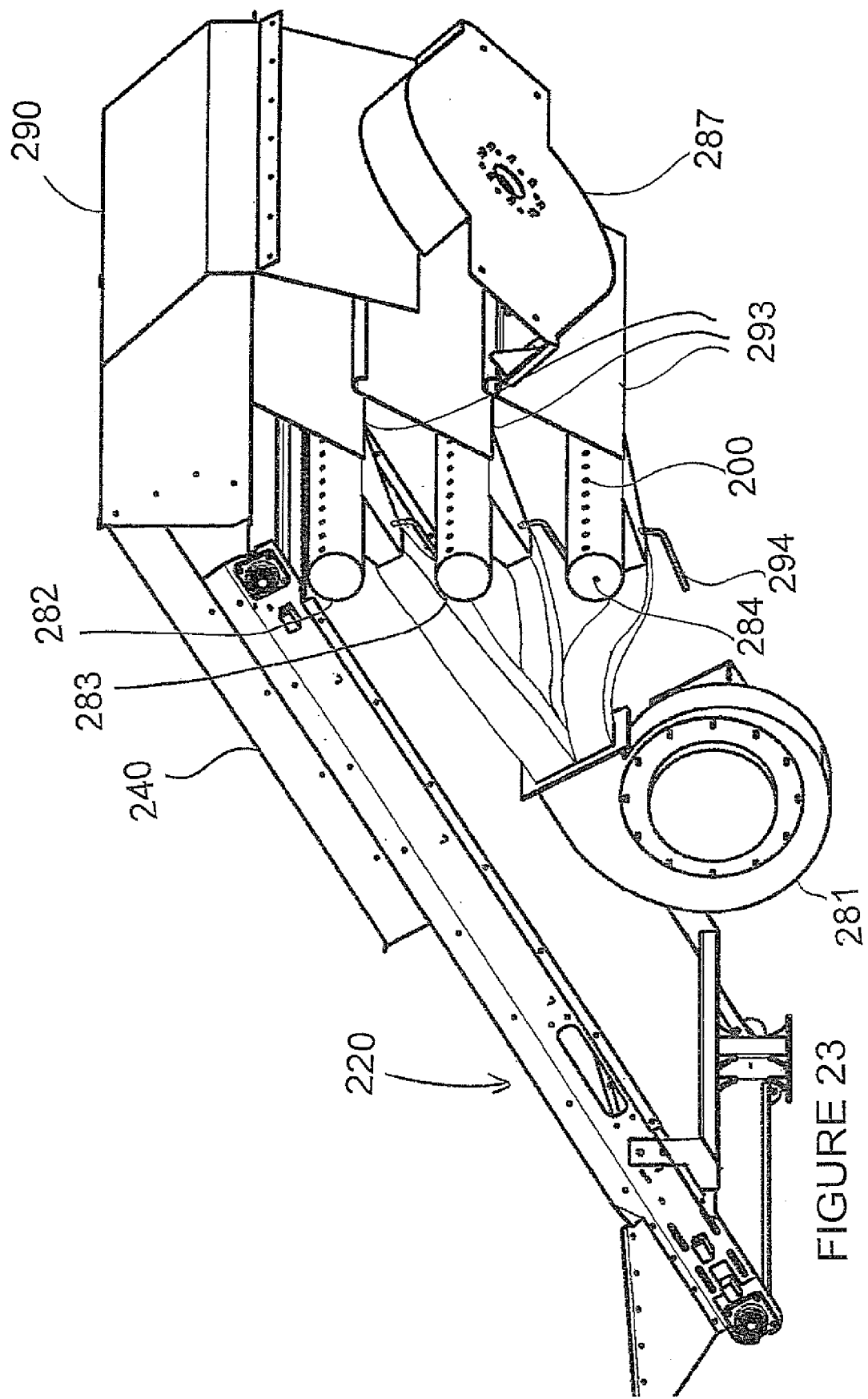
FIG. 23 is an isometric view from the bottom and one side of the embodiment of FIG. 21.

Referring now to FIGS. 22 and 23, the separation mechanisms are further detailed. The inlet conveyor 220 includes the covering hood 240 as previously described that in this case connects to a hood 290 at the end of the hood 240 which covers the top of the separating chamber to ensure all generated air flows downwardly toward and onto the spreader 287 at the exit 291. The transverse air plenums 282, 283 and 284 extend across the open space forming the separating section and each includes an airflow control device 294 so that the airflow out of nozzles 200 at spaced positions along the transverse plenum can be regulated. The plenums are rotationally adjustable about their longitudinal axis so that trajectory 295 of the air jet can be altered in angle around the axis to fine tune separation. The stover louvers 293 are angled upwardly and rearwardly so that cobs impacting on the louvers fall backwardly to the inlet hopper 285 of the second conveyer 286 to help retain cobs and allow stover to be blown between the upwardly inclined louvers 293 and over the top of the louvers 293 to fall to the spreader 287. The narrow air jet from the plenums is generally directed so as to hit the top end of each corresponding stover louver.

The corn cobs and stover on the inlet conveyor 220 are discharged from the end of the conveyor within the hood 290 at location 292 and fall vertically in the open space between air plenums 282, 283, 284 on one side and the stover louvers 293 on the other side. The corn cobs tend to settle to the bottom of the conveyor 220 by the time they reach discharge location 292 so, as the material falls, the lighter stover is toward the right and is blown to the right to pass over the top surface of each corresponding stover louver.

The air jet from the top plenum 282 is set to the highest velocity and does the greatest amount of cleaning so that under typical conditions only 15% of the stover may remain in the stream falling below this plenum.

If any falling corn cob has any remaining husks attached, it will also be moved to the right. However, because of the weight difference between the cob and the stover, it is not carried over the top edge of the inclined louver; and it drops out of the air jet while it is retained by the louver, and falls to the next air jet where the process is repeated. Each air jet velocity and trajectory can be independently adjusted for the best possible cob sample.

The discharge spreader 287 is designed not only to spread but also to create a suction to pull any material through the louvers into the top of the discharge spinners and help improve the flow of the stover out of the machine. Cob losses thus can be dramatically reduced with multiple cleaning sections.

Referring now to the fourth embodiment shown in FIGS. 24 to 27, this uses the same trailer construction and using many of the features described above.

The separation system uses a similar concept to that shown in the second embodiment but, as opposed to the stacked arrangement, divides the three separation sections into separate locations.

Figure 24:
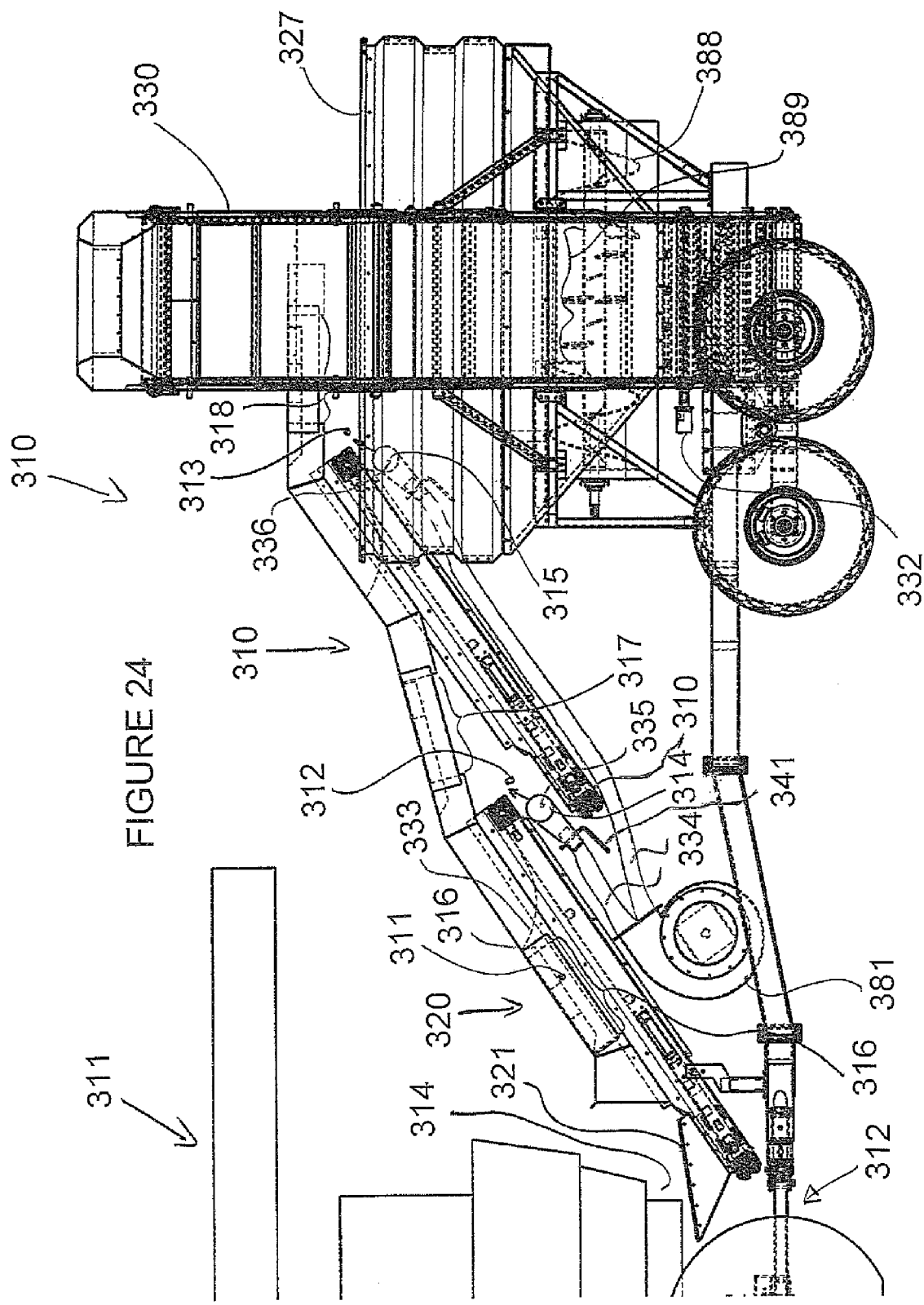
FIG. 24 is a side elevational view of a fourth embodiment of cob harvesting machine according to the present invention.
Figure 25:
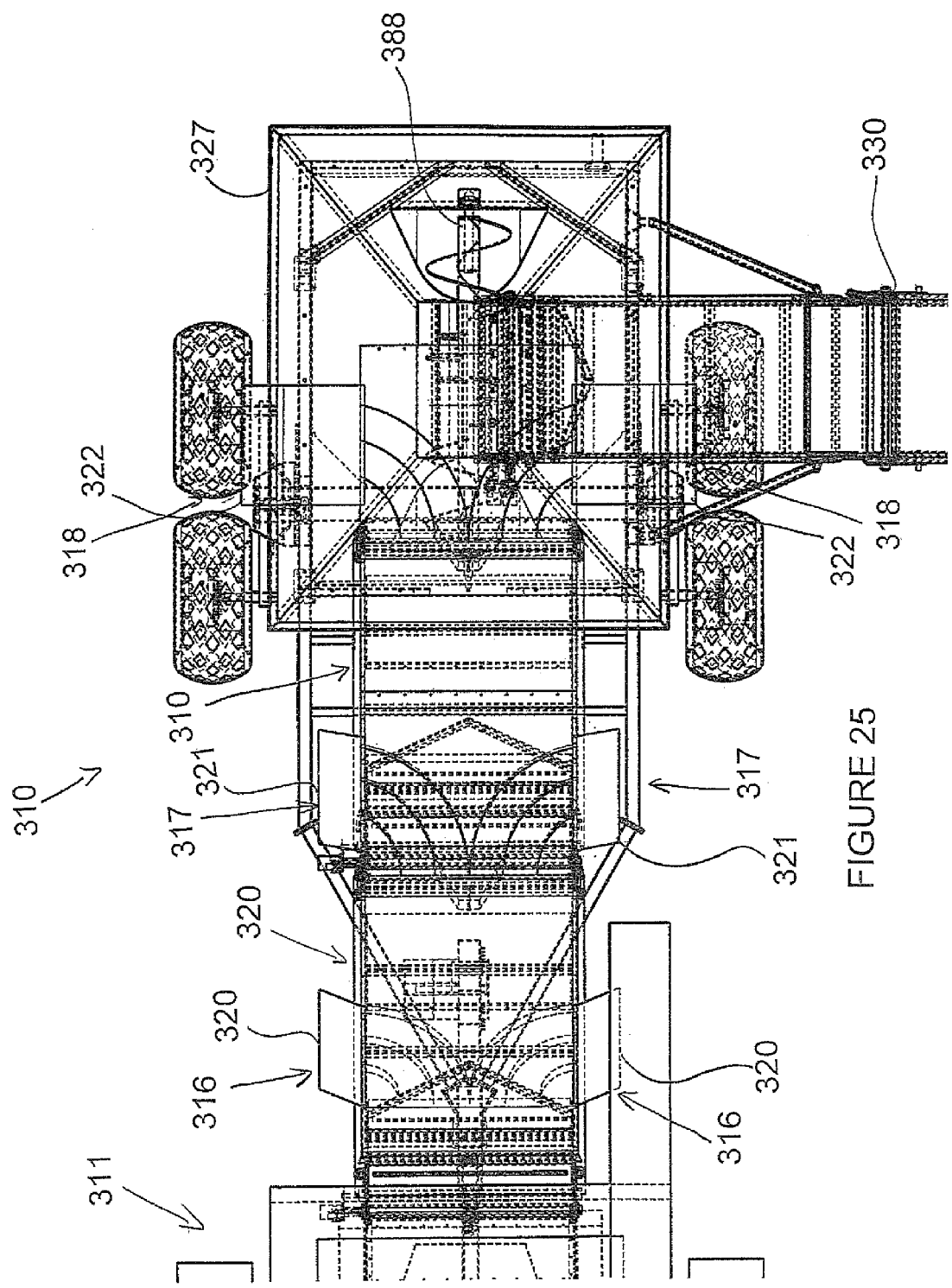
FIG. 25 is top plan view of the embodiment of FIG. 24.
Figure 27:
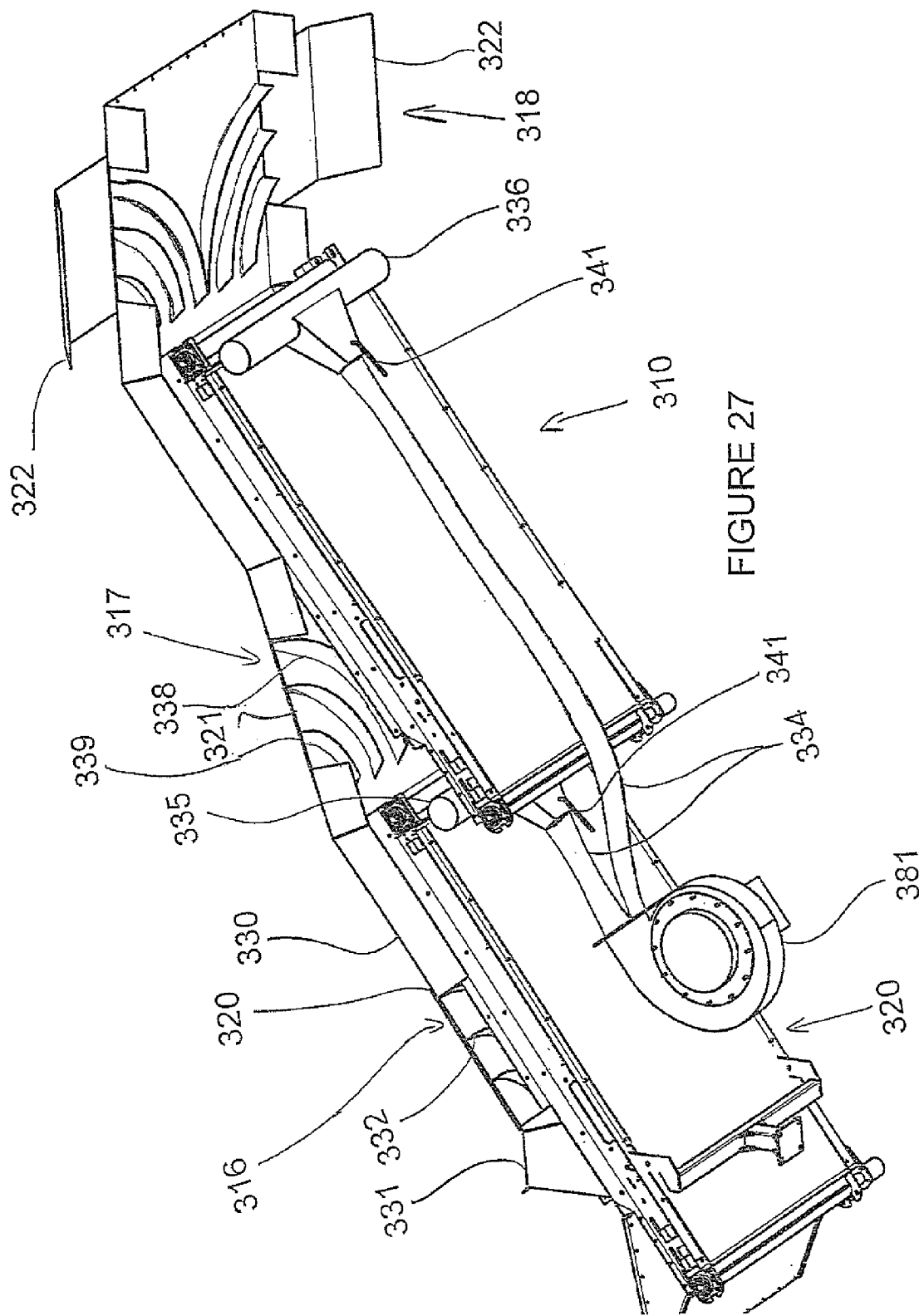
FIG. 27 is an isometric view from the bottom and one side of the embodiment of FIG. 24.

The cob harvester in FIGS. 24 and 27 is shown without shields and framework for better visualization of the separation system. The system includes the inlet conveyor 320 and a second conveyor 310 and three separation regions 311, 312 and 313.

The first separation region 311 utilizes the combine's sieve airflow expelled at outlet 314 to remove the lightest weight residue. Two further separating sections 312 and 313 use the plenum and guide surface concept of the above embodiment.

A fan 381 is used for generating air jets from the plenums 314 and 315 in the second region 312 and third separating region 313.

Residue at each of the three separating sections is expelled from a respective one of three outlets 316, 317 and 318. Adjustable deflectors 320, 321 and 32 (best shown in FIG. 27) are located at the outlets and are used to engage the light material being discharged to optimize the spread pattern. At the second separating section 312 clean cobs drop into the hopper 310 of the second conveyor. At the third separating section 313 clean cobs drop into the tank 327.

Figure 26:
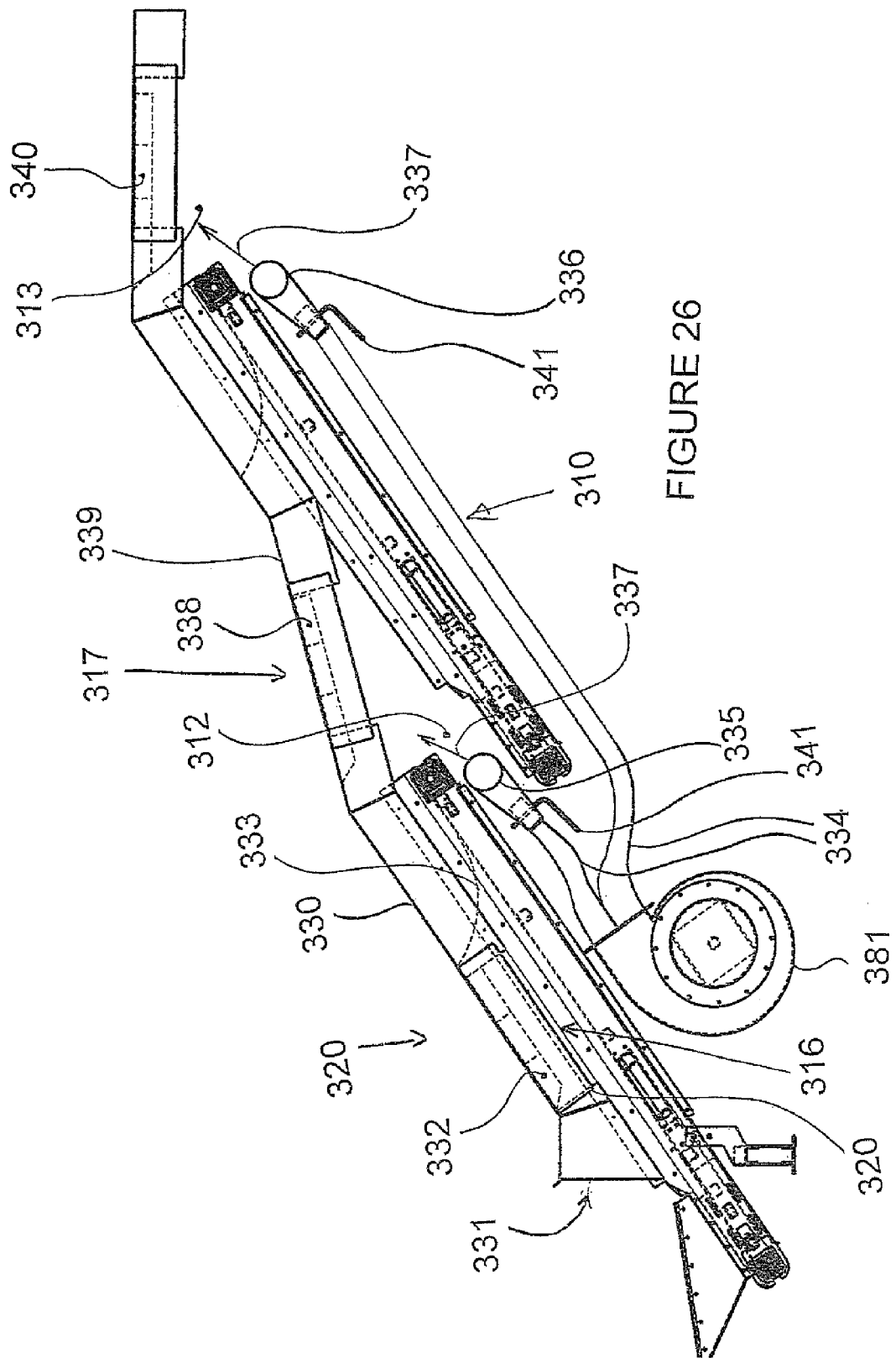
FIG. 26 is a side elevational view of a part only of the embodiment of FIG. 24.

Referring to FIG. 26 and 27, the separation mechanisms are further detailed. The inlet conveyor 320 includes a hood 330 with an upwardly and rearwardly inclined inlet top wall 331 to capture all of the air, dust and stover being expelled from the residue outlet of the combine. Immediately upstream from the conveyor inlet a set of fins 332 is mounted to the bottom side of the conveyor hood. The fins utilize the airflow captured from the combine and re-direct the light residue out of the side of the conveyor hood at the first outlet 316. A flexible rubber flap 333 draped over the conveyor allows any remaining cobs and residue to pass underneath, while sealing the open void and forcing air to be exhausted from the hood at the first residue outlet 316. Deflectors 320 are mounted above the outlet 316 at the sides to direct the residue into a spread pattern. Typically up to 25% of the residue is removed at the first stage and all of the dust and light residue is redirected to the ground at the sides, keeping the harvester and combine much cleaner. The inlet conveyor 320 then elevates the remaining stover to the second separating region 312.

The cob separating mechanisms for the second and third stages is similar to that of the second embodiment except that each includes only a single air plenum. Thus these separating devices include the fan 381 for generating air flow and pressure, ducts 334 for transporting pressurized air to transverse air plenums 335 and 336 and holes in the plenums for creating air jets 337 to blast through the stover. Each plenum's air jet velocity can be adjusted independently with control valves 141 and the jet's trajectory can be altered with rotational adjustment of the plenum about its transverse axis. The cobs and residue fall from the upper end of the first conveyor 320 though the open space to the inlet 310 at the bottom end of the second conveyor 310 and pass through a hard air blast from air plenum 335. The air blast accelerates and lifts the lighter residue separating it from the heavier cobs. The lighter residue is directed into fins 138 mounted to the bottom side of the second stage cover 339. The fins redirect the residue and airflow out the side of the machine at outlet 317. Adjustable deflectors 321 directed the residue flow down and away from the machine in a spread pattern.

In certain varieties of corn or in dry fall conditions it is typical to have the husks attached to the cob after the combine is finished threshing. There is very little that the combine operator can do to adjust the combine to get a clean cob sample. These cobs are often very difficult to save, in an air based separation system, since the cob and husks have a much higher surface area to weight ratio as compared to a clean cob. Often with an air blast set hard enough to separate the cobs from the residue these cobs are thrown out by the separator. With this system the air blast is set just low enough so that the cobs do not hit the fins 338. All lighter residue is elevated into the fins and redirected out of the machine. Cobs with husks attached are thrown by the air blast upwardly and rearwardly to a height where they do not impact the fins and thus they fall to the second conveyor 310 upwardly from the inlet end 310, and cobs without any husks attached fall vertically to the inlet 310 at the lower end of the second conveyor. The cobs and any remaining residue are then elevated on the second conveyor 310 and repeat the process at the third separation region 313 where the cobs fall into the tank 327.

The air blast from each separation region elevates the lighter residue to the bottom side of each corresponding hood where a set of fins directs the residue away from the flow of cobs moving to the storage tank on the conveyors. Adjustable deflectors 321 and 322 are mounted at the each residue outlet 317 and 318 respectively to spread the residue down and away from the machine in an even spread pattern.

Figure 28:
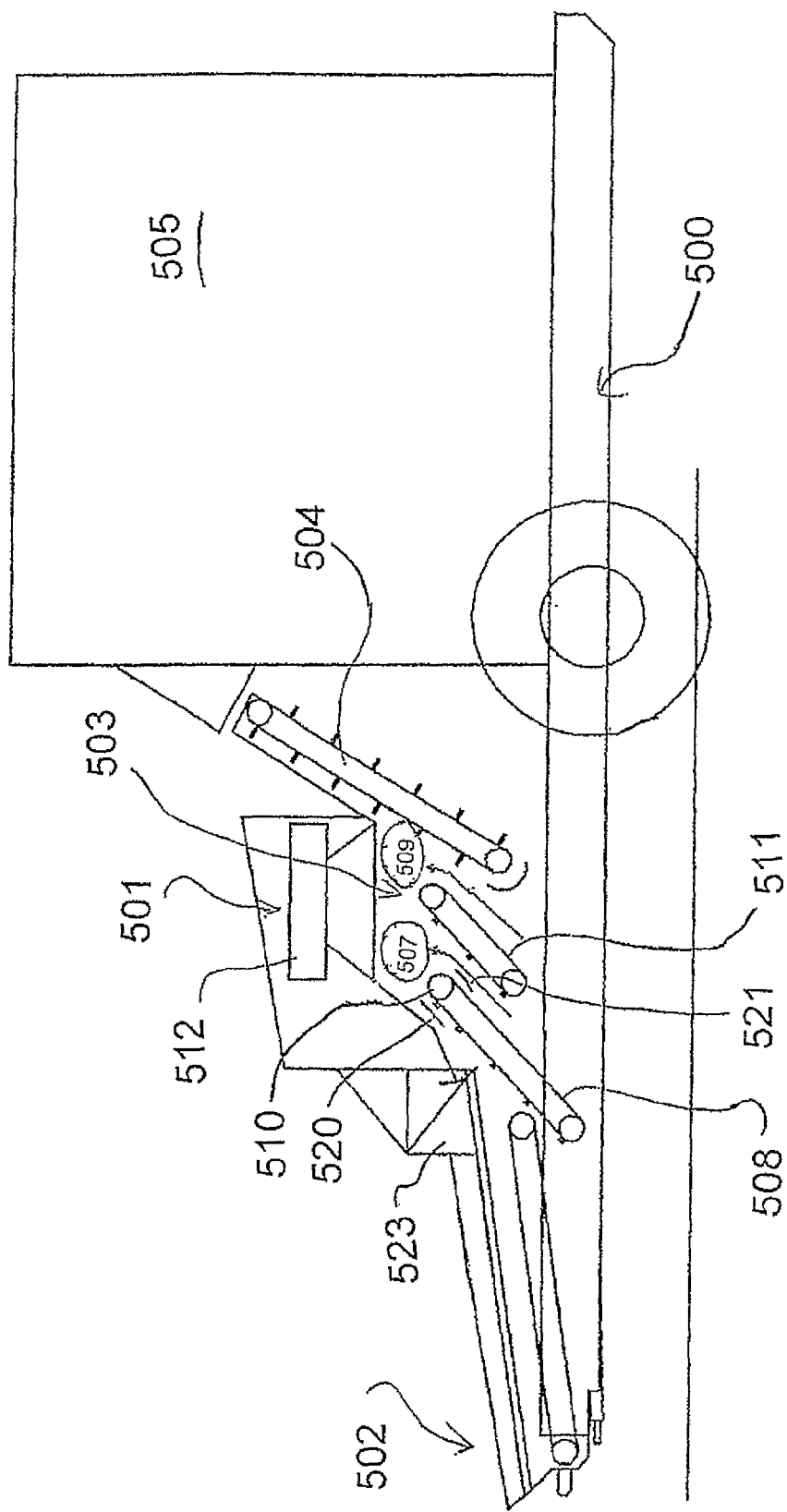
FIG. 28 is a side elevational view of a fifth embodiment of cob harvesting machine according to the present invention.

Referring now to the embodiment shown in FIG. 28, there is shown a further embodiment based on the same trailer construction 500 and using many of the features described above. The arrangement shown in FIG. 28 is shown only schematically, however the details shown and described in previous figures can also be used in this embodiment and the amendments and arrangements necessary will be known to one skilled in this art. The separation system uses a similar concept to that shown in the first, third and fourth embodiments but uses a common suction fan 501 located above the stages where the separation occurs.

Thus the apparatus includes a receiving section 502 for collecting residue material from the combine harvester and transferring this to the separation section 503 and the transfer conveyer 504 for supply to the tank 505. The apparatus also includes a hitch 540.

The separating section includes two stages as shown but can include three stages or possibly more if required. In each case the stages are arranged sequentially with the second stage following the first stage and receiving the cobs from the first stage.

The first stage 507 includes a first conveyor 508 arranged to raise the residue material to an upper end 510 of the conveyor from which the residue material is discharged by its own momentum into an open space marked at 507 from which the cobs fall downwardly for collection onto the conveyor 511 of the second stage 509.

The second stage includes the second conveyor 511 arranged to catch and raise the residue material from the first stage to an upper end of the conveyor 511 from which the residue material is discharged by its momentum into the open space 509 from which the cobs fall downwardly for collection on the transfer conveyer 504.

In the embodiment shown, the spaces 507 and 509 form part of a common space underneath the common suction fan 501 so that the first and second stages each include a system generating an airflow through the open space such that materials in the residue having a higher surface area to weight ratio are carried in the air stream to a discharge location and materials in the residue including the cobs having a lower surface area to weight ratio fall downwardly for collection. The systems in the first and second stages include the common fan 501 generating a common air stream which forms the air streams in the two stages. As previous described, the system includes guide walls or surfaces 541 and 542 which act to direct the air so that it enters the space underneath the discharge end of the previous conveyor at a position immediately above the feed end of the subsequent conveyor so that all of the material falling toward the inlet end of the subsequent conveyor passes through the air stream and air stream acts as a separation system based upon the ratio of weight to surface area of the materials in the air stream.

The multiple stage separation is therefore carried out with one fan. The single fan is arranged such that the fan is sucking material off of the top of the conveyors 508 and 511 as the material separates when it is thrown in the air. Multiple stages are important when separating cobs from stover as the residue volume out of the back end of the combine is so great it is impossible to save all the cobs and get a clean sample in one stage. The goal of the machine is to save substantially all the cobs while removing as much stover as possible. Problems can occur in a single stage when a large leaf is laying under a cob. In this case, if too much suction is applied the leaf will be sucked out carrying the cob with it.

The stages can be arranged by using baffles and/or guides 520 and 521 such that the air velocity to the fan passing through the space in the first stage 507 is lower than in the second stage 509.

The fan has a discharge guide section 512 substantially as previously described for discharging the collected material from the first and second stages to the sides of the cart.

The fan housing is provided with a venturi arrangement 523 at the front end for drawings in air from the combine as previously described.

The single suction fan assembly is located above the spaces of the first and second stages with the intake of the fan facing downwardly. The fan housing's inlet has guide walls facing downwardly to draw the air into the fan housing from the separation zones 507 and 509.

The conveyors 508, 511 and 504 are arranged in a row with a leading end below the previous discharge to catch the materials falling from the previous discharge point and from that leading end are inclined upwardly with an upper end at discharging upwardly into the respective space or into the tank. The air stream is arranged to pass between the conveyors of the first and second stage and between the conveyor of the second stage and the transfer conveyor. The conveyors have ribs or projections acting to catch and accelerate the cobs as they fall.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for collecting corn cobs discharged in residue from a rear of a combine harvester when used to harvest corn, the method comprising:
   providing a cart having a hitch coupling;
   collecting the residue containing the cobs and a residue material discharged from the combine harvester in a receiving section;
   separating the cobs from the residue material to be discharged in a separating arrangement;
   providing a tank for receiving the cobs from which the residue material has been separated;
   wherein the separating arrangement includes at least two stages with the second stage following the first stage and receiving the cobs from the first stage;
   wherein the first stage includes a first conveyor arranged to raise a stream of the residue from the combine harvester to an upper end of the conveyor from which the stream of the residue from the combine harvester is discharged into a first open space from which the cobs fall downwardly for collection;
   wherein the second stage includes a second conveyor arranged to receive at a lower end material from the first stage and to raise the material to an upper end of the conveyor from which the material is discharged into a second open space from which the cobs fall downwardly for collection;
   and generating airflows through the materials discharged into the first and second open spaces to effect separation of said residue material from the cobs;
   wherein the airflows are generated by a single common fan;
   causing air from the airflows to flow upwardly from the first open space thereby extracting upwardly some of the residue material from the first open space;
   discharging the residue material extracted upwardly from the stream of the residue so as to leave only the cobs and a part of the residue material from the first open space which fall from the first open space downwardly onto the second conveyor below the first open space;
   causing air from the airflows to flow upwardly from the second open space thereby extracting upwardly some of the residue material from the second open space;
   and discharging the residue material extracted from second open space so as to leave only the cobs and any remaining residue material from the second open space to fall for collection.

2. The method according to claim 1 wherein the system is arranged such that the air velocity passing through the first open space is lower than the air velocity passing through the second open space.

3. The method according to claim 1 wherein the single common fan is a suction fan arranged to draw the air upwardly from the first and second open spaces for said discharge of the residue material extracted from the first and second open spaces.

4. The method according to claim 1 wherein the residue material extracted from the first and second stages is discharged from the cart at a position above the first and second open spaces.

5. The method according to claim 4 wherein the residue material extracted from the first and second stages is discharged to the sides of the cart.

6. The method according to claim 3 wherein the suction fan is located above the first and second open spaces of the first and second stages with an intake of the fan facing downwardly.

7. The method according to claim 1 wherein the first and second conveyors are inclined upwardly.

8. The method according to claim 1 wherein the airflow in the first stage is arranged to pass between the first conveyor and the second conveyor.

9. The method according to claim 1 wherein the conveyors are belt conveyors.

10. A method for collecting corn cobs discharged in residue from a rear of a combine harvester when used to harvest corn, the method comprising:
    providing a cart having a hitch coupling;
    collecting the residue containing the cobs and a residue material discharged from the combine harvester in a receiving section;
    separating the cobs from the residue material to be discharged in a separating arrangement;
    providing a tank for receiving the cobs from which the residue material has been separated;
    wherein the separating arrangement includes at least two stages with the second stage following the first stage and receiving the cobs from the first stage;
    wherein the first stage includes a first conveyor arranged to raise a stream of the residue from the combine harvester to an upper end of the conveyor from which the stream of the residue from the combine harvester is discharged into a first open space from which the cobs fall downwardly for collection;

wherein the second stage includes a second conveyor arranged to receive at a lower end material from the first stage and to raise the material to an upper end of the conveyor from which the material is discharged into a second open space from which the cobs fall downwardly for collection;

and generating airflows through the materials discharged into the first and second open spaces to effect separation of said residue material from the cobs;

wherein the airflows are generated by at least one suction fan for drawing the residue materials into an inlet of the suction fan;

causing air from the airflows to flow upwardly from the first open space to said at least one suction fan thereby extracting upwardly some of the residue material from the first open space;

discharging the residue material extracted upwardly from the stream of the residue so as to leave only the cobs and a part of the residue material from the first open space which fall from the first open space downwardly onto the second conveyor below the first open space;

causing air from the airflows to flow upwardly from the second open space to said at least one suction fan thereby extracting upwardly some of the residue material from the second open space;

and discharging from said at least one suction fan the residue material extracted from second open space so as to leave only the cobs and any remaining residue material from the second open space to fall for collection.

11. The method according to claim 10 wherein the air velocity passing through the first open space is lower than the air velocity passing through the second open space.

12. The method according to claim 10 wherein the first and second conveyors are inclined upwardly.

13. The method according to claim 10 wherein said at least one suction fan comprises a single suction fan is.

14. The method according to claim 13 wherein the collected material from the first and second stages is discharged from the single suction fan.

15. The method according to claim 14 wherein the collected material is discharged to the sides of the cart.

16. The method according to claim 13 wherein the suction fan is located above the spaces of the first and second stages with an intake of the fan facing downwardly.

17. The method according to claim 13 wherein the airflow in the first stage is arranged to pass between the first conveyor and the second conveyor.

18. A method for collecting corn cobs discharged in residue from a rear of a combine harvester when used to harvest corn, the method comprising:

providing a cart having a hitch coupling;

collecting the residue containing the cobs and a residue material discharged from the combine harvester in a receiving section;

separating the cobs from the residue material to be discharged in a separating arrangement;

providing a tank for receiving the cobs from which the residue material has been separated;

wherein the separating arrangement includes at least two stages with the second stage following the first stage and receiving the cobs from the first stage;

wherein the first stage includes a first conveyor arranged to raise a stream of the residue from the combine harvester to an upper end of the conveyor from which the stream of the residue from the combine harvester is discharged into a first open space from which the cobs fall downwardly for collection;

wherein the second stage includes a second conveyor arranged to receive at a lower end material from the first stage and to raise the material to an upper end of the conveyor from which the material is discharged into a second open space from which the cobs fall downwardly for collection;

and generating airflows through the materials discharged into the first and second open spaces to effect separation of said residue material from the cobs;

and causing the airflow passing through the first open space to have an air velocity which is lower than an air velocity of the airflow passing through the second open space.

19. A method for collecting corn cobs discharged in residue from a rear of a combine harvester when used to harvest corn, the method comprising:

providing a cart having a hitch coupling;

collecting the residue containing the cobs and a residue material discharged from the combine harvester in a receiving section;

separating the cobs from the residue material to be discharged in a separating arrangement;

providing a tank for receiving the cobs from which the residue material has been separated;

wherein the separating arrangement includes at least two stages with the second stage following the first stage and receiving the cobs from the first stage;

wherein the first stage includes a first conveyor arranged to raise a stream of the residue from the combine harvester to an upper end of the conveyor from which the stream of the residue from the combine harvester is discharged into a first open space from which the cobs fall downwardly for collection;

wherein the second stage includes a second conveyor arranged to receive at a lower end material from the first stage and to raise the material to an upper end of the conveyor from which the material is discharged into a second open space from which the cobs fall downwardly for collection;

generating airflows through the materials discharged into the first and second open spaces to effect separation of said residue material from the cobs;

causing air from the airflows to flow upwardly from the first open space thereby extracting upwardly some of the residue material from the first open space;

discharging the residue material extracted upwardly from the stream of the residue so as to leave only the cobs and a part of the residue material from the first open space which fall from the first open space downwardly onto the second conveyor below the first open space;

causing air from the airflows to flow upwardly from the second open space thereby extracting upwardly some of the residue material from the second open space;

and discharging the residue material extracted from second open space so as to leave only the cobs and any remaining residue material from the second open space to fall for collection.

20. The method according to claim 19 wherein the residue falling from the first conveyor forms a first stream passing through the first open space and the system includes guide surfaces arranged to direct the airflow through the first open space across the stream of residue material to effect separation and wherein the material from the first stage falling from the second conveyor forms a second stream passing through the second open space and the system includes guide surfaces arranged to direct the airflow through the second open space across the stream of residue material to effect separation.

21. The method according to claim 19 wherein the collected material is discharged to the sides of the cart.

22. The method according to claim 19 wherein the airflow in the first stage is arranged to pass between the first conveyor and the second conveyor.

23. The method according to claim 19 wherein the airflow passing through the first open space has a lower velocity than the airflow passing through the second open space.

24. The method according to claim 19 wherein the airflow in the first and second open spaces is generated by a single common fan.

25. The method according to claim 24 wherein the single common fan is a suction fan arranged to draw the air through the first and second open spaces.

26. The method according to claim 25 wherein the suction fan is located above the first and second open spaces with an intake of the fan facing downwardly.

27. The method according to claim 24 wherein the single common fan discharges the collected material from the first and second spaces.

28. The method according to claim 27 wherein the single common fan discharges to the sides of the cart.

29. The method according to claim 19 wherein the first and second conveyors are inclined upwardly.

30. The method according to claim 19 wherein the first and second conveyors are belt conveyors.

31. The method according to claim 19 wherein the airflow to the first open space is arranged to pass between the first conveyor and the second conveyor.

* * * * *